United States Patent
Suenaga et al.

(10) Patent No.: US 8,017,893 B2
(45) Date of Patent: Sep. 13, 2011

(54) HIGH-FREQUENCY HEATING APPARATUS

(75) Inventors: Haruo Suenaga, Osaka (JP); Hideaki Moriya, Nara (JP); Shinichi Sakai, Nara (JP); Hisashi Morikawa, Nara (JP); Toyotsugu Matsukura, Nara (JP); Nobuo Shirokawa, Nara (JP)

(73) Assignee: Panasonic Corporation, Osaka (JP)

( * ) Notice: Subject to any disclaimer, the term of this patent is extended or adjusted under 35 U.S.C. 154(b) by 1322 days.

(21) Appl. No.: 10/599,961

(22) PCT Filed: Apr. 22, 2005

(86) PCT No.: PCT/JP2005/007697
§ 371 (c)(1),
(2), (4) Date: Oct. 16, 2006

(87) PCT Pub. No.: WO2005/107326
PCT Pub. Date: Nov. 10, 2005

(65) Prior Publication Data
US 2008/0272115 A1    Nov. 6, 2008

(30) Foreign Application Priority Data

Apr. 28, 2004    (JP) .................................. 2004-132640

(51) Int. Cl.
*H05B 6/64*    (2006.01)
(52) U.S. Cl. ...................................................... 219/702
(58) Field of Classification Search .................. 219/715, 219/678, 721
See application file for complete search history.

(56) References Cited

U.S. PATENT DOCUMENTS

| | | | | |
|---|---|---|---|---|
| 5,903,446 A | * | 5/1999 | Huillet et al. .................... | 363/17 |
| 6,362,463 B1 | * | 3/2002 | Bessyo et al. .................. | 219/715 |
| 6,437,546 B1 | * | 8/2002 | Kunii et al. .................... | 323/222 |
| 2005/0174819 A1 | * | 8/2005 | Yang ............................. | 363/127 |

FOREIGN PATENT DOCUMENTS

| | | |
|---|---|---|
| CN | 88102449 A | 11/1988 |
| CN | 1311975 A | 9/2001 |
| EP | 0289013 B1 | 4/1988 |
| EP | 0289032 B1 * | 1/1997 |
| JP | 7-161464 | 6/1995 |
| JP | 11-26153 | 1/1999 |
| JP | 2000-58252 | 2/2000 |
| JP | 2003-257604 * | 9/2003 |
| JP | 2003-259643 * | 9/2003 |

OTHER PUBLICATIONS

Chinese Office Action.

* cited by examiner

*Primary Examiner* — Henry Yuen
*Assistant Examiner* — Thien Tran
(74) *Attorney, Agent, or Firm* — Pearne & Gordon LLP

(57) ABSTRACT

A purpose of the present invention is to provide an inverter circuit capable of suppressing an overshooting phenomenon of an input current at an instantaneous time when an initiating operation of the inverter circuit is switched to the normal operation thereof, and thus, capable of preventing damages of IGBTs and a magnetron.

In a high frequency heating apparatus comprising: a control signal forming circuit for forming a control signal from a difference between an input current of an AC power supply and a reference current; a frequency modulated signal forming circuit for correcting rectified voltage/rectified current which are obtained by rectifying the AC voltage/current of the AC power supply based upon the control signal of the control signal forming circuit; and a dead time forming circuit for receiving the output of the frequency modulated signal forming circuit, a control signal converting circuit having a function capable of further lowering the value of the control signal is provided between the control signal forming circuit and the frequency modulated signal forming circuit.

21 Claims, 19 Drawing Sheets

FIG. 9 (a)
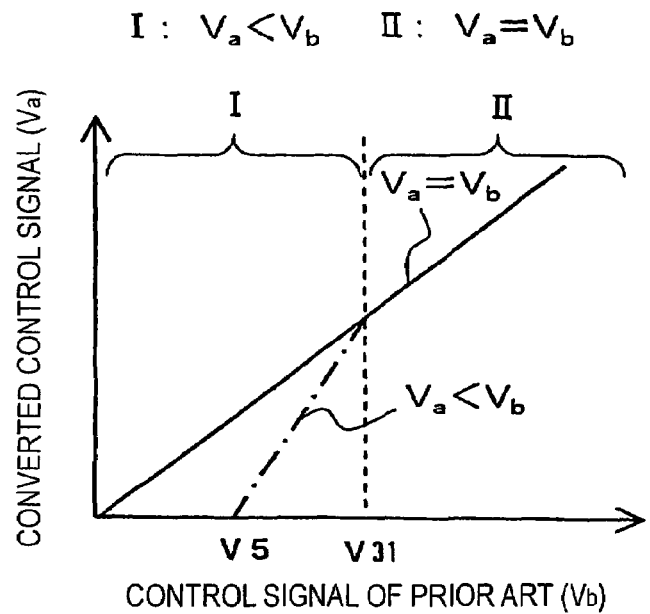
FIG. 9 (b1)
[UNDER INITIATING OPERATION]
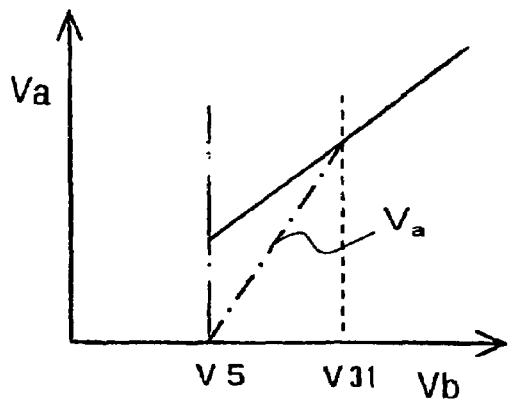
FIG. 9 (b2)
[UNDER NORMAL OPERATION]
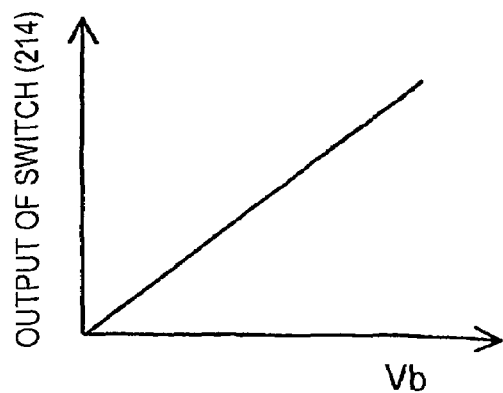

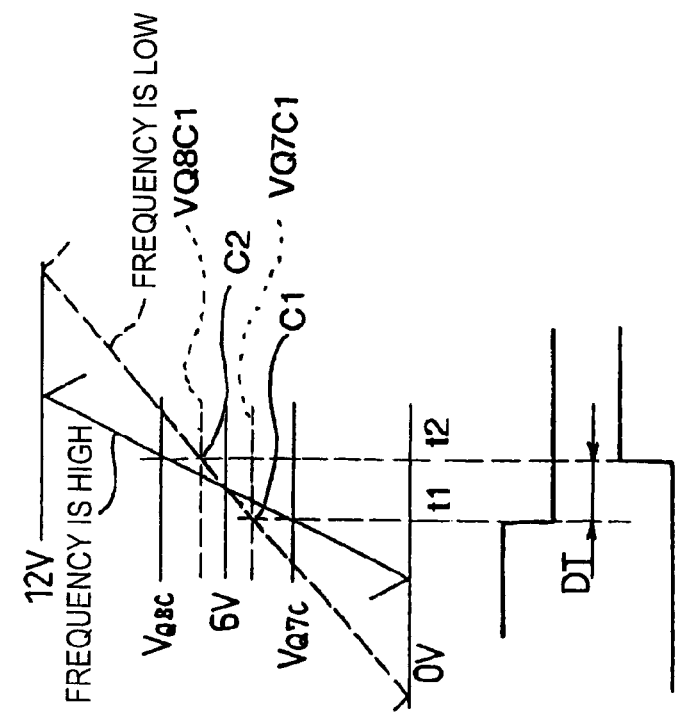
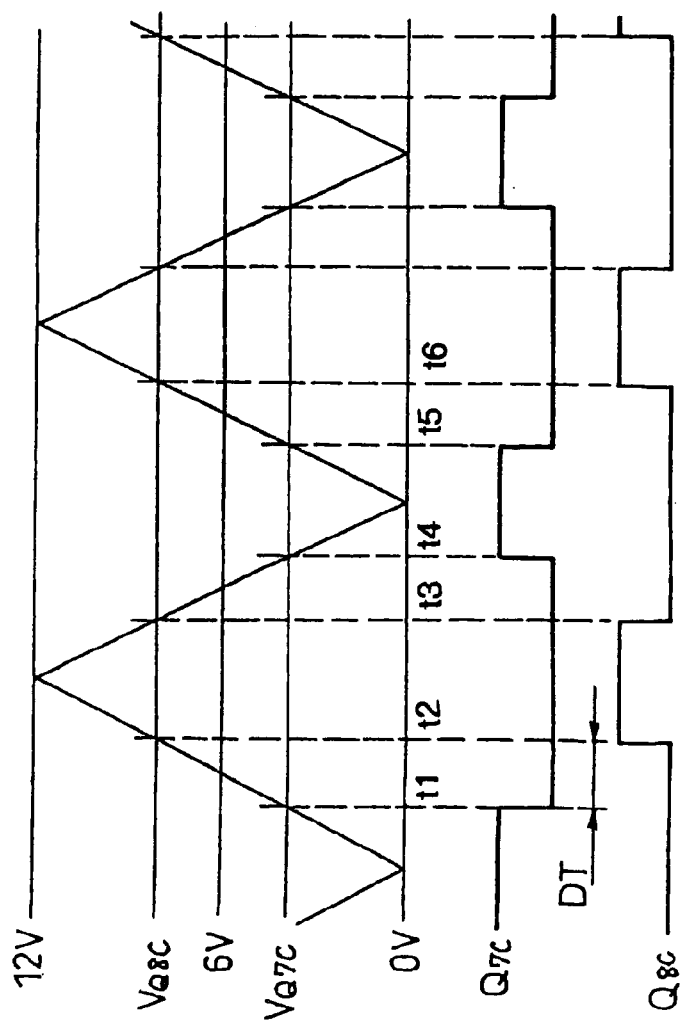
FIG. 12(a)
FIG. 12(b)

FIG. 15 (a)
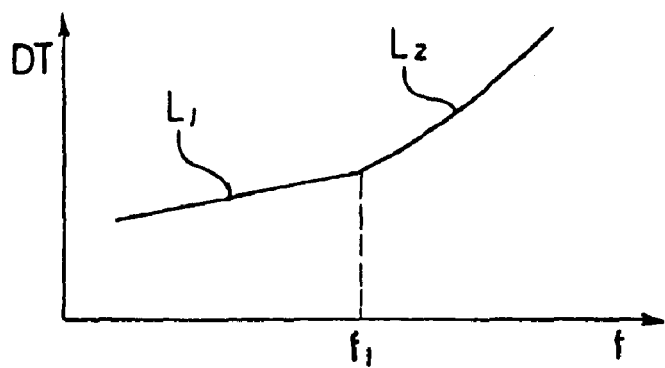
FIG. 15 (b1)
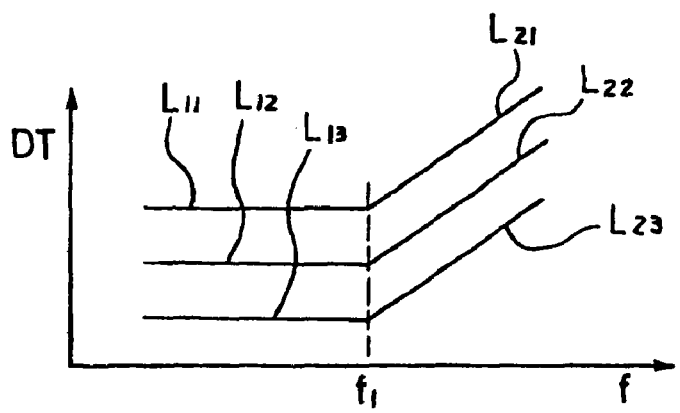
FIG. 15 (b2)
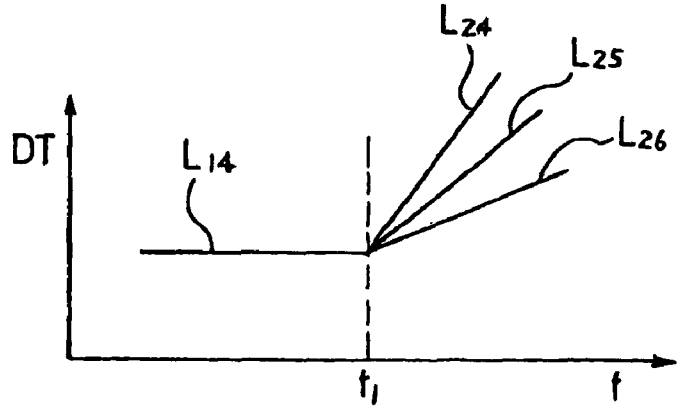
FIG. 15 (b3)
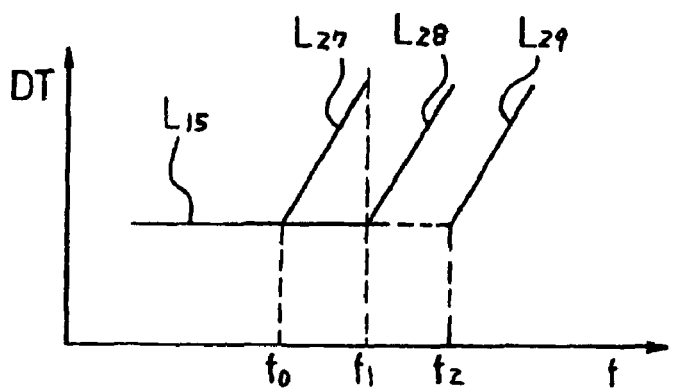

HIGH-FREQUENCY HEATING APPARATUS

TECHNICAL FIELD

The present invention relates to a high frequency heating apparatus using a magnetron such as a microwave oven. More specifically, the present invention is directed to an inverter circuit of such a high frequency heating apparatus.

BACKGROUND ART

Since conventional power supplies mounted on high frequency heating apparatus have been made heavy and bulky, these conventional power supplies are desired to be made compact and light weight. As a result, various technical ideas capable of manufacturing these power supplies in compact, light weight and low cost have be actively progressed in such a way that these power supplies are constructed in switching modes. In high frequency heating apparatus which cook food products by using microwaves generated by magnetrons, various needs capable of making power supplies compact and in light weight have been requested, which are employed so as to drive magnetrons. These needs could be realized by switching-type inverter circuits.

Among these switching type inverter circuits, more specifically, a high frequency inverter circuit which is directed by the present invention corresponds to a resonant type circuit system with employment of two switching elements which construct arms of bridge circuits (refer to, for example, JP-A-2000-58252).

When a 1-transistor type inverter (width ON/OFF-control type inverter) is arranged, a withstanding voltage between a collector and an emitter of this transistor requires approximately 1000V. However, when a 2-transistor type inverter having abridge circuit is arranged, withstanding voltages between collectors and emitters of these transistors are not required to be so high withstanding voltages. As a result, if the inverter circuit is constructed of the bridge circuit arrangement, then the withstanding voltages between the collectors and the emitters of these transistors may be lowered to approximately 600 V. Accordingly, there is such a merit that low-cost transistors may be used in these transistor inverters. In this sort of inverter, while a resonant circuit is constituted by an inductance "L" and a capacitance "C", this inverter owns such a resonance characteristic as represented in FIG. 1, in which a resonant frequency "f0" is defined as a peak.

FIG. 1 is a graphic diagram for representing a current-to-used frequency characteristic in the case that a constant voltage is applied to an inverter resonant circuit according to the present invention.

A frequency "f0" corresponds to a resonant frequency of an LC resonant circuit of the inverter circuit, and a current-to-frequency characteristic curve "I1" of a frequency range defined from "f1" to "f3", which is higher than this resonant frequency "f0" is utilized.

At the resonant frequency "f0", a current I1 becomes maximum, and in connection with an increase of the frequency range from f1 to f3, this current I1 is decreased. Within the frequency range defined from f1 to f3, the lower the frequency is decreased, the closer the frequency is approached to the resonant frequency f0, so that the current I1 is increased. As a result, a current flowing through a secondary winding of a leakage transformer is increased. Conversely, the higher the frequency is increased, the further the frequency is separated apart from the resonant frequency f0, so that the current I1 is decreased. As a result, the current flowing through the secondary winding of the leakage transformer is decreased. In the inverter circuit for driving a microwave oven which functions as a non-linear load, since this frequency is varied, power of the microwave oven is changed.

As will be explained later, in the case that an input power supply for a microwave oven using a non-linear load of a magnetron corresponds to an AC source such as a commercial power supply, the microwave oven causes a switching frequency to be changed.

As to respective high frequency power of a microwave oven, the highest frequency appears at temperatures of approximately 90 degrees and about 270 degrees. For instance, when the microwave oven is operated at 200 W, the operating frequency is approached to f3; when the microwave oven is operated at 500 W, the operating frequency is lower than f3; and when the microwave oven is operated at 1000 W, the operating frequency is further lower than f3. Apparently, since either an input power control or an input current control is carried out, this frequency may be changed in accordance with changes as to voltages of a commercial power supply, temperatures of the microwave oven, and the like.

Also, in the vicinity of 0 degree and 180 degrees of phases of the above-described power supply voltage, since the operating frequency of the magnetron is set near the frequency "f1" which is close to the resonant frequency "f0" where the resonant current is increased in correspondence with such a characteristic of a magnetron that if a high voltage is not applied thereto, then this magnetron is not resonated in a high frequency, a boosting ratio of the voltage applied to the magnetron to the voltage of the commercial power supply is increased, and also, the phase width of the commercial power supply is set to be widened, by which electromagnetic waves are produced from the magnetron.

FIG. 2 shows an example of a resonant type high frequency heating apparatus operated by switching elements of a two-element bridge circuit, which is described in JP-A-2000-58252. In FIG. 2, the high frequency heating apparatus has been arranged by a DC power supply 1, a leakage trans former 2, a first semiconductor switching element 6, a first capacitor 4, a second capacitor 5, a third capacitor (smoothing capacitor) 13, a second semiconductor switching element 7, a driving unit 8, a full-wave doubler rectifying circuit 10, and a magnetron 11.

The DC power supply 1 rectifies an AC voltage of a commercial power supply in a full-wave rectification mode to produce a DC voltage VDC, and then, applies the DC voltage VDC to a series circuit constituted by the second capacitor 5 and a primary winding 3 of the leakage transformer 2. While the first semiconductor switching element 6 has been series-connected to the second semiconductor switching element 7, the series circuit constituted by the primary winding 3 of the leakage transformer 2 and the second capacitor 5 has been connected parallel to the second semiconductor switching element 7.

The first capacitor 4 has been connected parallel to the second semiconductor switching element 7. An AC high voltage output generated from a secondary winding 9 of the leakage transformer 2 has been converted into a DC high voltage by the full-wave doubler rectifying circuit 10, and then, this DC high voltage has been applied between an anode and a cathode of the magnetron 11. A thirdly winding 12 of the leakage transformer 2 supplies a current to the cathode of the magnetron 11.

The first semiconductor switching element 6 has been constituted by an IGBT (Insulated Gate Bipolar Transistor) and a flywheel diode connected parallel to the IGBT. Similarly, the second semiconductor switching element 7 has been constituted by an IGBT and a flywheel diode connected parallel to the IGBT.

As apparent from the foregoing description, both the first and second semiconductor switching elements 6 and 7 are not limited only to the above-explained sort of semiconductor switching element, but a thyristor, a GTO (Gate Turn Off) switching element, and the like may be alternatively employed.

The driving unit 8 contains an oscillating unit which is used so as to produce drive signals for driving the first semiconductor switching element 6 and the second semiconductor switching element 7. While this oscillating unit oscillates the drive signals having predetermined frequencies and duty ratios, the driving unit 8 has applied these drive signals to the first semiconductor switching element 6 and the second semiconductor switching element 7.

The first semiconductor switching element 6 and the second semiconductor switching element 7 are alternately driven, or are driven by providing such a time period during which both the first and second semiconductor switching elements 6 and 7 are commonly turned OFF, namely by providing a dead time by employing a dead time forming means (will be explained later). Just after any one of the first and second semiconductor switching elements 6 and 7 has been turned OFF, a voltage across the terminals of the other semiconductor switching element is high. As a result, if the other semiconductor switching element is turned ON at this time, then an excessively large current having a spike shape may flow through this turned-ON switching element, so that unwanted loss and undesirable noise may be produced. However, since this turn-ON operation may be delayed until the high voltage across the switching element is decreased to approximately 0 V, the above-described loss and noise may be prevented. Apparently, a similar operation may be carried out when the switching element opposite to the above-described switching element is turned OFF.

FIG. 3 indicates respective modes in which the circuit of FIG. 2 is operated.

Also, FIG. 4 shows a voltage and current waveform diagram as to components such as semiconductor switching elements employed in the circuit.

In the drawing, in a mode 1 of FIG. 3(*a*), a drive signal is supplied to the first semiconductor switching element 6. At this time, a current flows from the DC power supply 1 through both the primary winding 3 of the leakage transformer 2 and the second capacitor 5.

In a mode 2 of FIG. 3(*b*), the first semiconductor switching element 6 is turned OFF, and the current which has flown through the primary winding 3 and the second capacitor 5 starts to flow along a direction to the first capacitor 4, and at the same time, the voltage of the first semiconductor switching element 6 is increased.

In a mode 3 of FIG. 3(*c*), the voltage of the first capacitor 4 is directed from VDC to zero V. In the mode 3, the voltage across both the terminals of the first capacitor 4 is reached to zero V, so that the diode which constitutes the second switching element 7 is turned ON.

In a mode 4 of FIG. 3(*d*), since the direction of the current is inverted which has flown through the primary winding 3 and the second capacitor 5 due to the resonant phenomenon, at this time, the second semiconductor switching element 7 must be turned OFF. In the time periods of the modes 2, 3, and 4, the voltage of the first semiconductor switching element 6 becomes equivalent to the DC power supply voltage VDC. In such a region as Europe where an effective value as to a commercial power supply voltage is 230 V, since a voltage peak becomes root 2 times higher than the effective voltage, a DC power supply voltage VDC becomes near equal to 325 V.

In a mode 5 of FIG. 3(*e*), the second semiconductor switching element 7 is turned OFF, and the current which has flown through the second capacitor 5 and the primary winding 3 starts to flow along a direction to the first capacitor 4, so that the voltage of the first capacitor 4 is increased up to the VDC.

In a mode 6 of FIG. 3(*f*), the voltage of the first capacitor 4 is reached to the voltage VDC, and thus, the diode which constitutes the first semiconductor switching element 6. Since the direction of the current is inverted which has flown through the primary winding 3 and the second capacitor 5 due to the resonant phenomenon, at this time, the first semiconductor switching element 6 must be turned ON, which constitutes the mode 1. In the time periods of the modes 1 and 6, the voltage of the second semiconductor switching element 7 becomes equivalent to the DC power supply voltage VDC.

In accordance with this circuit arrangement, a maximum value as to the voltages applied to both the first semiconductor switching element 6 and the second semiconductor switching element 7 can be set to the DC power supply voltage VDC.

Both the mode 2 and the mode 5 correspond to such a resonant period during which the current flown from the primary winding 3 may flow through the first capacitor 4 and the second capacitor 5. Since a capacitance value of the first capacitor 4 has been set lower than, or equal to $\frac{1}{10}$ of a capacitance value of the second capacitor 5, a combined capacitance value becomes nearly equal to the capacitance value of the first capacitor 4. The voltages applied to the first semiconductor switching element 6 and the second semiconductor switching element 7 in the modes 3 and 5 are changed based upon a time constant which is determined by this combined capacitance value and an impedance of the leakage transformer 3. Since this voltage change owns such an inclination which is determined based upon the above-explained time constant, the switching loss occurred when the first semiconductor switching element 6 is turned OFF in the mode 3 may be reduced.

Moreover, in the mode 5, since the voltage becomes zero, when the first semiconductor switching element 6 is turned ON in the mode 1, the voltage applied to the first semiconductor switching element 6 becomes zero, so that the switching loss of the first semiconductor switching element 6 can be reduced when this switching element 6 is turned ON. This is referred to as a "zero voltage switching" operation, and these items are features of the resonant circuit system. The present system utilizes these features, and owns such a merit that a voltage of a semiconductor switching element does not become higher than, or equal to the DC power supply voltage VDC. As shown in FIG. 4, the capacitance value of the second capacitor 5 has been set to a sufficiently large capacitance value in such a manner that the voltage of this second capacitor 5 contains a small ripple component.

On the other hand, as shown in FIG. 2, in such an inverter circuit that the series connection circuit constructed of the first and second switching elements 6 and 7 has been connected parallel to the DC power supply 1 and the arm has been constituted by two switching elements, since the ON/OFF operations of the first and second semiconductor switching elements 6 and 7 are alternately repeated, the high frequency AC voltage is generated in the primary winding 3 of the leakage transformer 2, and then, the high frequency high-voltage is induced in the secondary winding 9. Such an instantaneous time period during which both the first and second semiconductor switching elements 6 and 7 are turned ON at the same time is not completely provided. This is because the shortcircuit of the DC power supply 1 may occur.

Under such a circumstance, conventionally, a time period (will be referred to as "dead time" and will be abbreviated as "DT") has been necessarily provided, during which both the first and second switching elements 6 and 7 are not turned ON after any one of the first and second semiconductor switching elements 6 and 7 has been turned OFF until the remaining semiconductor switching element is turned ON.

Now, the dead time (DT) will be explained with reference to FIG. 4.

FIG. 4 indicates voltage waveforms and current waveforms as to the first and second semiconductor switching elements 6 and 7 (FIG. 2), and the first and second capacitors 4 and 5 (FIG. 2) in the above-explained respective modes 1 to 6.

A part (a) of FIG. 4 shows a current waveform of the first semiconductor switching element 6 in the above-explained respective modes 1 to 6. The first semiconductor switching element 6 which had been conducted from a time instant "t0" (accordingly, voltage between emitter and collector of first semiconductor switching element 6 becomes zero in (b) of FIG. 4) has been turned OFF (namely current becomes zero) at an ending time instant "t1" of the mode 1.

On the other hand, (d) of FIG. 4 shows a voltage waveform of the second semiconductor switching element 7. The second semiconductor switching element 7 which has been turned OFF from the time instant "t0" is continued to be turned OFF until a starting time instant "t2" of the mode 3 in which an ON signal is applied.

As a consequence, in a time period "DT1" defined from the time instant "t1" up to the time instant "t2", both the first semiconductor switching element 6 and the second semiconductor switching element 7 are commonly turned OFF.

This time period DT1 corresponds to a minimum value which is required for the dead time. A maximum value of the dead time corresponds to a time period defined from the time instant t1 up to the time instant t3. Thus, the dead time is allowed within this time range.

Similarly, such a time period "DT2" corresponds to a minimum value which is required for the dead time. This time period "DT2" is defined by that after the second semiconductor switching element 7 is turned OFF (namely, current becomes zero) at a time instant "t4" (see (c) of FIG. 4), until an ON signal is applied to the first semiconductor switching element 6 at a starting time instant "t5" of the mode 6 as represented in (a) of FIG. 4. A maximum value of the dead time corresponds to such a time period from the time instant "t4" up to a time instant "t6". Thus, the dead time is allowed within this time range.

In the conventional 2-transistor type inverter circuit, these dead times "DT" have been defined as the time period "DT1" and the time period "DT2" in such a manner that such a time range is calculated where the turn-ON and turn-OFF operations of the first semiconductor switching element 6 are not overlapped with those of the second semiconductor switching element 7. These time periods DT1 and DT2 have been calculated as fixed values.

In the case of an inverter circuit for a microwave oven, however, when the inverter circuit is driven in a range of a high switching frequency, a time duration after one semiconductor switching element is turned OFF until a voltage Vce between an emitter and a collector of another semiconductor switching element is decreased to 0 V is prolonged. As a consequence, after one semiconductor switching element has been turned OFF, and the fixed dead time has passed, if a turn-ON signal is applied to the other switching element, then the other semiconductor switching element is turned ON while the voltage Vce between the emitter and the collector is not decreased to 0 V. When the switching frequency is high, a heat loss may be produced in the semiconductor switching elements. Thus, malfunction of the semiconductor switching elements and an occurrence of a spike current may constitute a noise generating source.

The reason why the above-explained heat loss and noise are produced will now be explained with reference also to FIG. 4.

That is, even when the first semiconductor switching element 6 is turned OFF (namely, current becomes zero) in the time instant t1 (see (a) of FIG. 4), such a time duration defined by subtracting the time instant "t1" from the time instant "t2" is required in order that the voltage (solid line) across both the terminals of the second semiconductor switching element 7 is dropped to 0 V (see (d) of FIG. 4). As a result, when the turn-ON signal is applied to the other semiconductor switching element 7 at the time instant t2, since the voltage Vce between the emitter and the collector of the second switching element 7 has been decreased to 0 V, this second semiconductor switching element 7 is turned ON (becomes conductive) from the voltage of 0 V (this operation is referred to as "zero volt switching" operation). As a consequence, there is no problem as to the heat loss and the noise.

However, an inclination of a trapezoid of the voltage VDC is changed in response to a strength of resonance. If the resonance is strong (namely, frequency is low), then the inclination becomes sharp, so that the voltage across both the terminals of the first semiconductor switching element 7 quickly becomes zero volt. If the resonance is weak (namely, frequency is high), then the inclination becomes gentle, so that a lengthy time is required in order that the voltage across both the terminals of the first semiconductor switching element 7 is lowered to zero volt.

As previously explained, when the inverter circuit is operated in the high frequency range, the switching frequency is separated apart from the resonant frequency, so that the time constant is prolonged, and in (d) of FIG. 4, a time duration becomes long during which the voltage (indicated by dot line) across both the terminals of the other (second) semiconductor switching element 7 is decreased to 0 V. Thus, this voltage cannot be completely decreased to 0 V during a time period between the time instant t1 and the time instant t2, but even after the time instant t2 has elapsed, a predetermined voltage (refer to symbol Vt2 of dot line F in (d) of FIG. 4) is still applied to this second semiconductor switching element 7.

As a consequence, when the turn-ON signal is applied to the second semiconductor switching element 7 at the time instant "t2" in accordance with the normal operation manner, this second semiconductor switching element 7 is turned ON while the predetermined voltage Vt2 is being still applied between the emitter and the collector of this second semiconductor switching element 7, so that the heat loss has been produced. Also, the steep spike current may flow due to an occurrence of a large dv/dt, which causes the noise source.

Even when such a hard switching operation (namely, switching operation is forcibly carried out even when either voltage or current is not zero) is carried out, since the dead time is secured, this hard switching operation never conducts such a failure that the power supply is shortcircuited, but an extra heat loss may be merely produced in the IGBT. However, since these heat losses are cooled by a heat sink, even when such heat losses may occur, the inverter operation could be continuously carried out under the normal condition. Also, the noise caused by the spike current could not become a considerably large noise value as a serious problem. Accordingly, in the conventional inverter circuits, the failure as to the above-described hard switching operation does not completely constitute the problem. As a consequence, the below-mentioned inverter circuit may be conceived. That is, while the dead time "DT" which has been conventionally fixed is variable, in this inverter circuit, useless energy is not consumed, no adverse influence is given to lifetimes of semiconductor switching elements, and moreover, noise can be hardly produced.

In such a high frequency heating apparatus equipped with a dead time forming circuit which forms either a fixed dead time or a variable dead time, a predetermined time duration after this high frequency heating apparatus has been initiated and until an oscillation of a magnetron becomes stable is required.

Furthermore, when the oscillation of the magnetron is stabilized and is then transferred to the normal condition, such an overshoot phenomenon may occur that an input current Iin flowing through a main circuit exceeds a specified current value. Then, if the input current Iin of the main circuit overshoots, then there is a risk that both the IGBTs and the magnetron are damaged. Therefore, it is rapidly required to suppress the overshoot phenomenon so as to protect these electronic components.

DISCLOSURE OF THE INVENTION

Problem to be Solved by the Invention

The present invention has been made to solve the above-described problems, and therefore, has an object to provide a high frequency heating apparatus capable of quickly stabilizes an oscillation of a magnetron after the high frequency heating apparatus has been initiated.

Furthermore, the present invention has a secondary object to provide a high frequency heating apparatus capable of avoiding such an operation that when an oscillation of a magnetron has been stabilized and is transferred to the normal condition, an input current of a main circuit overshoots.

Means for Solving Problem

To solve the above-described problem, a high frequency heating apparatus, recited in claim 1 of the present invention, is featured by such a high frequency heating apparatus for driving a magnetron, comprising: a DC power supply which is constituted by an AC power supply, a rectifying circuit for rectifying an AC voltage of the AC power supply, and a smoothing capacitor for smoothing an output DC voltage of the rectifying circuit; a series circuit constituted by two pieces of semiconductor switching elements; a resonant circuit in which a primary winding of a leakage transformer and a capacitor are connected, the series circuit being connected parallel to the DC power supply, and one end of the resonant circuit being connected to a center point of the series circuit and the other end of the resonant circuit being connected to one end of the DC power supply in an AC equivalent circuit; driving means for driving the semiconductor switching elements respectively; rectifying means connected to a secondary winding of the leakage transformer; and the magnetron connected to the rectifying means; in which the high frequency heating apparatus is further comprised of: a control signal forming circuit for forming a control signal from a difference between an input current of the AC power supply and a reference current, or a difference between a voltage to be applied to the magnetron and a reference voltage; a frequency modulated signal forming circuit for correcting rectified voltage/rectified current which are obtained by rectifying the AC voltage/current of the AC power supply based upon the control signal of the control signal forming circuit; and a dead time forming circuit for receiving the output of the frequency modulated signal forming circuit; and wherein in which a control signal converting circuit having a function capable of further lowering (in case of positive polarity) the value of the control signal is provided between the control signal forming circuit and the frequency modulated signal forming circuit.

A high frequency heating apparatus, recited in claim 2 of the present invention, is featured by such a high frequency heating apparatus for driving a magnetron, comprising: a DC power supply which is constituted by AC power supply, a rectifying circuit for rectifying an AC voltage of the AC power supply, and a smoothing capacitor for smoothing an output voltage of the rectifying circuit; two sets of series circuits, each of the series circuits being constituted by two pieces of semiconductor switching elements; a resonant circuit in which a primary winding of a leakage transformer and a capacitor are connected, the two sets of series circuits being connected parallel to the DC power supply respectively, and one end of the resonant circuit being connected to a center point of the one series circuit and the other end of the resonant circuit being connected to a center point of the other series circuit; driving means for driving the semiconductor switching elements respectively; rectifying means connected to a secondary winding of the leakage transformer; and the magnetron connected to the rectifying means; in which the high frequency heating apparatus is further comprised of: a control signal forming circuit for forming a control signal from a difference between an input current of the AC power supply and a reference current, or a difference between a voltage to be applied to the magnetron and a reference voltage; a frequency modulated signal forming circuit for correcting rectified voltage/rectified current which are obtained by rectifying the AC voltage/current of the AC power supply based upon the control signal of the control signal forming circuit; and a dead time forming circuit for receiving the output of the frequency modulated signal forming circuit; and in which a control signal converting circuit having a function capable of further lowering (in case of positive polarity) the value of the control signal is provided between the control signal forming circuit and the frequency modulated signal forming circuit.

A high frequency heating apparatus, recited in claim 3 of the present invention, is featured by such a high frequency heating apparatus for driving a magnetron, comprising: a DC power supply which is constituted by an AC power supply, a rectifying circuit for rectifying an AC voltage of the AC power supply, and a smoothing capacitor for smoothing an output voltage of the rectifying circuit; a series circuit constituted by two pieces of semiconductor switching elements; a resonant circuit in which a primary winding of a leakage transformer and a capacitor are connected, the series circuit being connected parallel to the DC power supply, and the resonant circuit being connected to one of the semiconductor switching elements in a parallel manner; driving means for driving the semiconductor switching elements respectively; rectifying means connected to a secondary winding of the leakage transformer; and the magnetron connected to the rectifying means; in which the high frequency heating apparatus is further comprised of: a control signal forming circuit for forming a control signal from a difference between an input current of the AC power supply and a reference current, or a difference between a voltage to be applied to the magnetron and a reference voltage; a frequency modulated signal forming circuit for correcting rectified voltage/rectified current which are obtained by rectifying the AC voltage/current of the AC power supply based upon the control signal of the control signal forming circuit; and a dead time forming circuit for receiving the output of the frequency modulated signal forming circuit; and in which a control signal converting circuit having a function capable of further lowering (in case of positive polarity) the value of the control signal is provided between the control signal forming circuit and the frequency modulated signal forming circuit.

A high frequency heating apparatus, recited in claim 4 of the present invention, is featured by such a high frequency heating apparatus as recited in any one of claims 1 to 3 in which the control signal converting circuit is comprised of an operational amplifier; the output of the control signal converting circuit is applied to one input terminal of the operational amplifier, and a potential at a junction point between two resistors of a series circuit is applied to the other input terminal of the operational amplifier; and the series circuit is constituted by the two resistors and a diode, which is interposed between a positive potential of another DC power supply and the output-sided terminal of the operational amplifier.

A high frequency heating apparatus, recited in claim 5 of the present invention, is featured by such a high frequency heating apparatus as recited in any one of claims 1 to 3 in which the control signal converting circuit is comprised of an amplifier having a comparing function; the output of the control signal forming circuit is entered to one input terminal of the amplifier, and the positive potential of the DC power supply is entered to the other input terminal of the amplifier; and a gain of the amplifier is switched by conducting/non-conducting a diode as the comparing function.

A high frequency heating apparatus, recited in claim 6 of the present invention, is featured by such a high frequency heating apparatus as recited in any one of claims 1 to 3 in which the control signal converting circuit is comprised of an amplifier having a comparing function; the output of the control signal forming circuit is entered to one input terminal of the amplifier, and the other input terminal of the amplifier owns a comparator which compares the positive potential of the DC power supply with the output of the control signal forming circuit; and a gain of the amplifier is switched by the comparator.

A high frequency heating apparatus, recited in claim 7 of the present invention, is featured by such a high frequency heating apparatus as recited in any one of claims 1 to 6 in which in the case that the control signal converting circuit is operated in a negative polarity instead of the positive polarity, the control signal converting circuit inverts the respective signals in the positive polarity.

A high frequency heating apparatus, recited in claim 8 of the present invention, is featured by such a high frequency heating apparatus as recited in any one of claims 1 to 7 in which the control signal is switched based upon a sensing signal of a magnetron oscillation sensing means.

A high frequency heating apparatus, recited in claim 9 of the present invention, is featured by such a high frequency heating apparatus as recited in any one of claims 1 to 8 in which the dead time forming circuit makes the dead time constant, or slightly increases the dead time irrespective of a switching frequency.

A high frequency heating apparatus, recited in claim 10 of the present invention, is featured by such a high frequency heating apparatus as recited in any one of claims 1 to 8 in which the dead time forming circuit increases the dead time in connection with an increase of a switching frequency.

A high frequency heating apparatus, recited in claim 11 of the present invention, is featured by such a high frequency heating apparatus as recited in claim 10 in which the dead time forming circuit makes the dead time constant, or slightly increases the dead time at a switching frequency which is lower than, or equal to a predetermined switching frequency.

A high frequency heating apparatus, recited in claim 12 of the present invention, is featured by such a high frequency heating apparatus as recited in claim 10, or claim 11 in which the dead time forming circuit rapidly increases the dead time at a switching frequency which is higher than, or equal to a predetermined switching frequency.

A high frequency heating apparatus, recited in claim 13 of the present invention, is featured by such a high frequency heating apparatus as recited in claim 11, or claim 12 in which either the constant value or the slightly increased value as to the dead time is variable at the switching frequency lower than, or equal to the predetermined switching frequency is variable, whereas the rapidly increased value as to the dead time is variable at the switching frequency higher than, or equal to the predetermined switching frequency is variable.

A high frequency heating apparatus, recited in claim 14 of the present invention, is featured by such a high frequency heating apparatus as recited in any one of claims 11 to 13 in which the predetermined frequency is variable.

A high frequency heating apparatus, recited in claim 15 of the present invention, is featured by such a high frequency heating apparatus as recited in any one of claims 1 to 8 in which the dead time forming circuit increases the dead time in a step wise manner in connection with an increase of a switching frequency.

A high frequency heating apparatus, recited in claim 16 of the present invention, is featured by such a high frequency heating apparatus as recited in any one of claims 1 to 15 in which the dead time forming circuit forms the dead time based upon both a plus offset voltage and a minus offset voltage, which are changed in a first inclination which is directly proportional to an increase of the switching frequency, and also, which are changed in a second inclination from the predetermined switching frequency.

A high frequency heating apparatus, recited in claim 17 of the present invention, is featured by such a high frequency heating apparatus as recited in any one of claims 1 to 16 in which the dead time forming circuit is comprised of: a VCC power supply; a duty control power supply; a first current which is changed directly proportional to a switching frequency; a second current which flows from the predetermined switching frequency and is changed directly proportional to the switching frequency; a third current which is produced by combining the first current with the second current and by multiplying the combined current by a predetermined coefficient; and upper/lower potential forming means for forming an upper potential and a lower potential, which are made by adding both a plus offset voltage and a minus offset voltage which are directly proportional to the third current to the voltage of the duty control power supply; and the variable dead time forming circuit forms the dead time based upon the upper potential and the lower potential.

A high frequency heating apparatus, recited in claim 18 of the present invention, is featured by such a high frequency heating apparatus as recited in claim 17 in which either an input power control operation or an input current control operation is carried out by changing at least one of the voltage of the duty control power supply and the switching frequency.

EFFECTS OF THE INVENTION

Since the above-described arrangement is employed, the voltage can rise without any time delay at the instantaneous time when the operation is switched from the initiation operation to the normal operation. As a consequence, the overshoot of the input current can be suppressed, so that the damages as to the IGBTs and the magnetron can be prevented.

BRIEF DESCRIPTION OF THE DRAWINGS

FIG. 9(a) is a graphic diagram for indicating a relationship between the control signal of the prior art and the converted control signal obtained by the present invention; FIG. 9(b1) is a graphic diagram for representing a relationship between Va and Vb during initiating operation; and FIG. 9(b2) is a graphic diagram for representing another relationship between the output of the switch 214 and Vb during normal operation.

FIG. 10(a) shows the converted control signal according to the present invention; and FIG. 10(b) indicates the control signal of the prior art.

FIG. 11(a) shows the converted control signal according to the present invention; and FIG. 11(b) indicates the control signal of the prior art.

FIGS. 12(a) and 12(b) are diagrams for explaining a basic idea of forming a dead time; FIG. 12(a) is a diagram for explaining a relationship between respective outputs of an oscillating circuit and of a variable dead time forming circuit, and an output of a rectangular wave forming circuit; and FIG. 12(b) is a diagram for explaining such a basic idea that even when a frequency is changed, a dead time DT is not changed in a range where the frequency is low.

FIGS. 15(a), 15(b1), 15(b2) and 15(b3) are graphic diagrams for showing a dead time-to-frequency characteristic owned by the variable dead time forming circuit; FIG. 15(a) shows an example in which the dead time DT is set to a constant, or is slightly increased at frequencies lower than, or equal to a frequency f1, and the dead time DT is rapidly increased at frequencies higher than, or equal to a predetermined switching frequency f1; FIG. 15(b1) is a modified example in which both the constant value and the rapidly increased value of the dead time DT are varied in upper/lower directions; FIG. 15(b2) is a modified example in which an inclination at the frequency f1 is varied; and FIG. 15(b3) is a modified example in which a frequency of an inflection point is movable along right/lower directions.

DESCRIPTION OF REFERENCE NUMERALS

1 DC power supply;
2 leakage transformer;
3 primary winding;
4 first capacitor;
5 second capacitor;
6 first semiconductor switching element;
7 second semiconductor switching element;
8 driving unit;
9 secondary winding;
10 full-wave doubler rectifying circuit;
11 magnetron;
12 thirdly winding;
13 third capacitor;
21 control signal forming circuit;
211 control signal converting circuit;
212 magnetron oscillation sensing means;
213 mode switching signal generating circuit;
214 mode switching switch;
215 battery;
22 frequency modulated signal forming circuit;
221a transistor;
221b, 221d, 221e resistor;
221c capacitor;
221f switch;
221g amplifier;
221h constant current source;
23 triangular wave carrier oscillating circuit;
24 dead time forming circuit;
25 rectangular wave forming circuit;
26 switching element driving circuit;

BEST MODE FOR CARRYING OUT THE INVENTION

Figure 5:
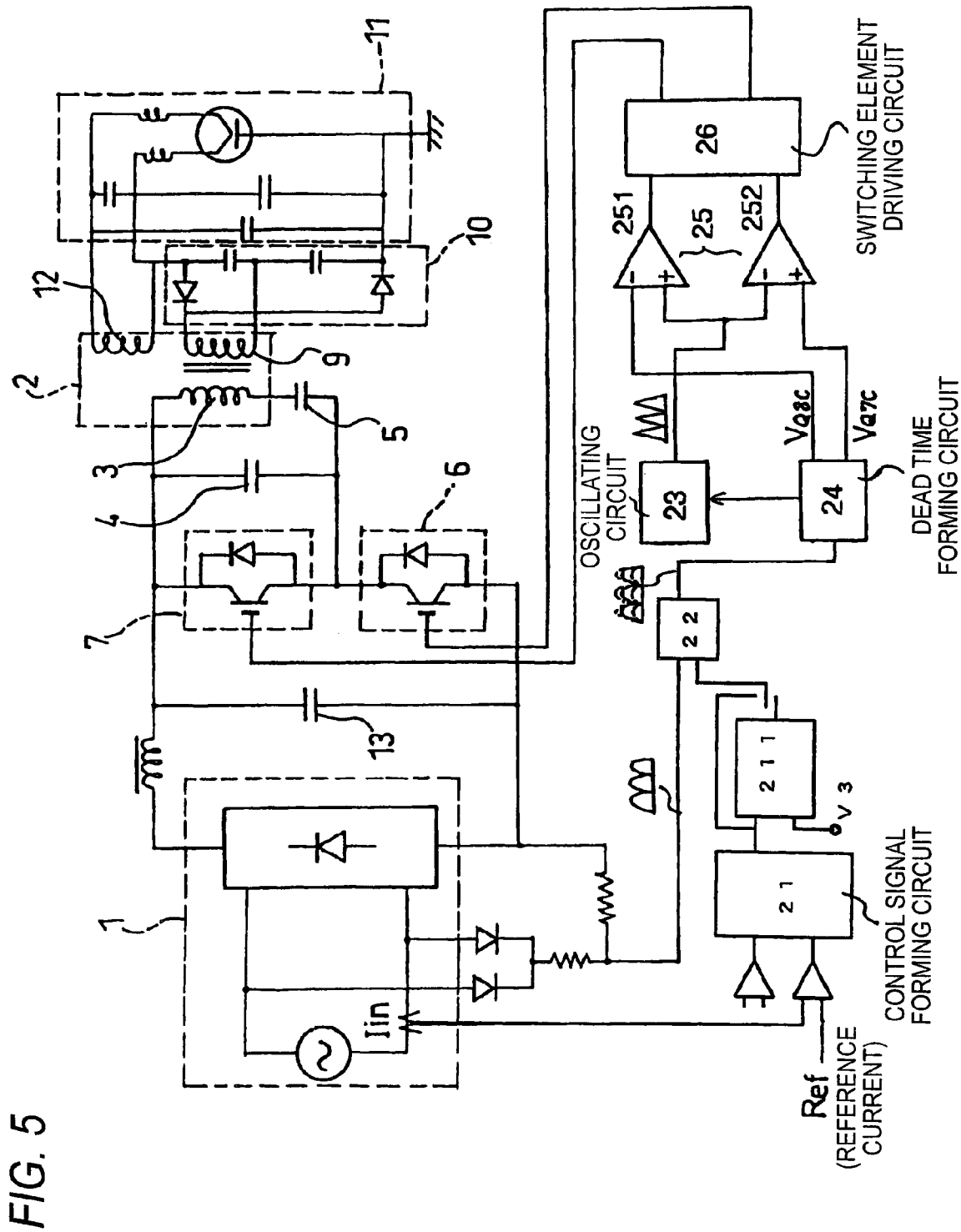
FIG. 5 is a diagram for indicating a high frequency heating apparatus driven by switching elements of a 2-switching element bridge, according to the present invention.

FIG. 5 is a diagram for showing a high frequency heating apparatus driven by switching elements of a 2-switching element bridge, according to the present invention.

Figure 2:
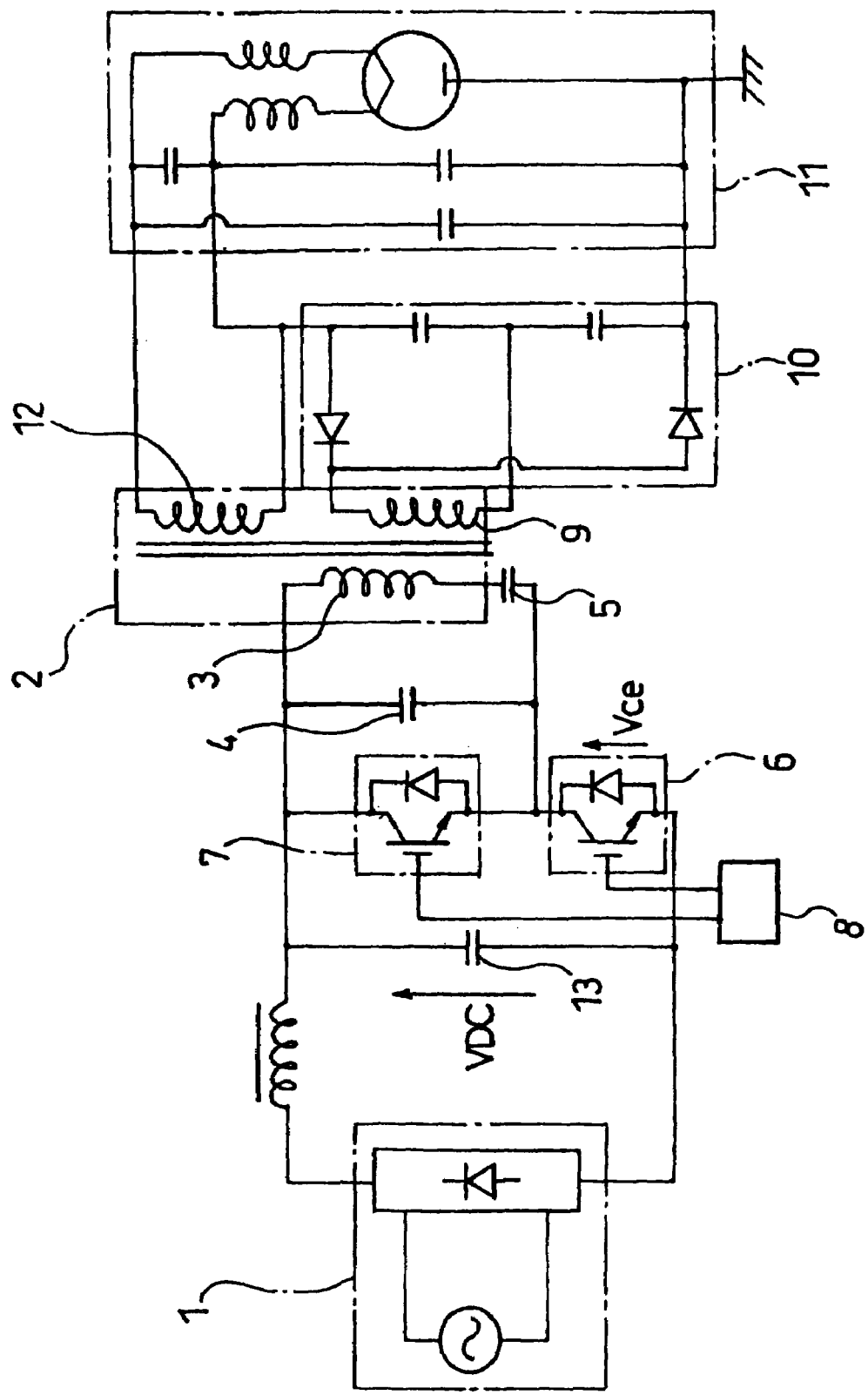
FIG. 2 is a circuit diagram for showing an example of the resonant type high frequency heating apparatus driven by the switching elements of the 2-switching element bridge, described in patent publication 1.

In this drawing, a major circuit of this high frequency heating apparatus has been arranged by a DC power supply 1, a leakage transformer 2, a first semiconductor switching element 6, a first capacitor 4, a second capacitor 5, a third capacitor (smoothing capacitor) 13, a second semiconductor switching element 7, a driving unit 8, a full-wave doubler rectifying circuit 10, and a magnetron 11. Since the arrangement of the major circuit shown in FIG. 5 is identical to that of FIG. 2, the same explanations are omitted.

Then, a control circuit for controlling the first and second semiconductor switching elements 6 and 7 is arranged by a control signal forming circuit 21, a control signal converting circuit 211, a frequency modulated signal forming circuit 22, an oscillating circuit 23, a dead time forming circuit 24, a rectangular wave forming circuit 25, and a switching element driving circuit 26. The control signal forming circuit 21 forms a control signal from either a difference between an input current "Iin" of the above-described AC power supply and a reference current "Ref", or a difference between a voltage applied to the magnetron 11 and a reference voltage. The control signal converting circuit 211 is provided on the output side of the control signal forming circuit 21. The frequency modulated signal forming circuit 22 forms a frequency modulated signal based upon the output signal of the control signal converting circuit 211 and the AC full-wave rectified signal. The oscillating circuit 23 produces a triangular carrier wave. The dead time forming circuit 24 varies a dead time based upon a magnitude of a switching frequency. The rectangular wave forming circuit 25 forms each of rectangular waves based upon the triangular wave outputted from the oscillating circuit 23 and each of outputs "VQ7C" and "VQ8C" of the variable dead time forming circuit 24. The switching element driving circuit 26 generates such a pulse for turning ON/OFF a switching element by the rectangular wave outputted from the rectangular wave forming circuit 25. The respective pulse outputs of the switching element driving circuit 26 are applied to the gates of the first and second switching elements (IG-BTs) 6 and 7.

Figure 6:
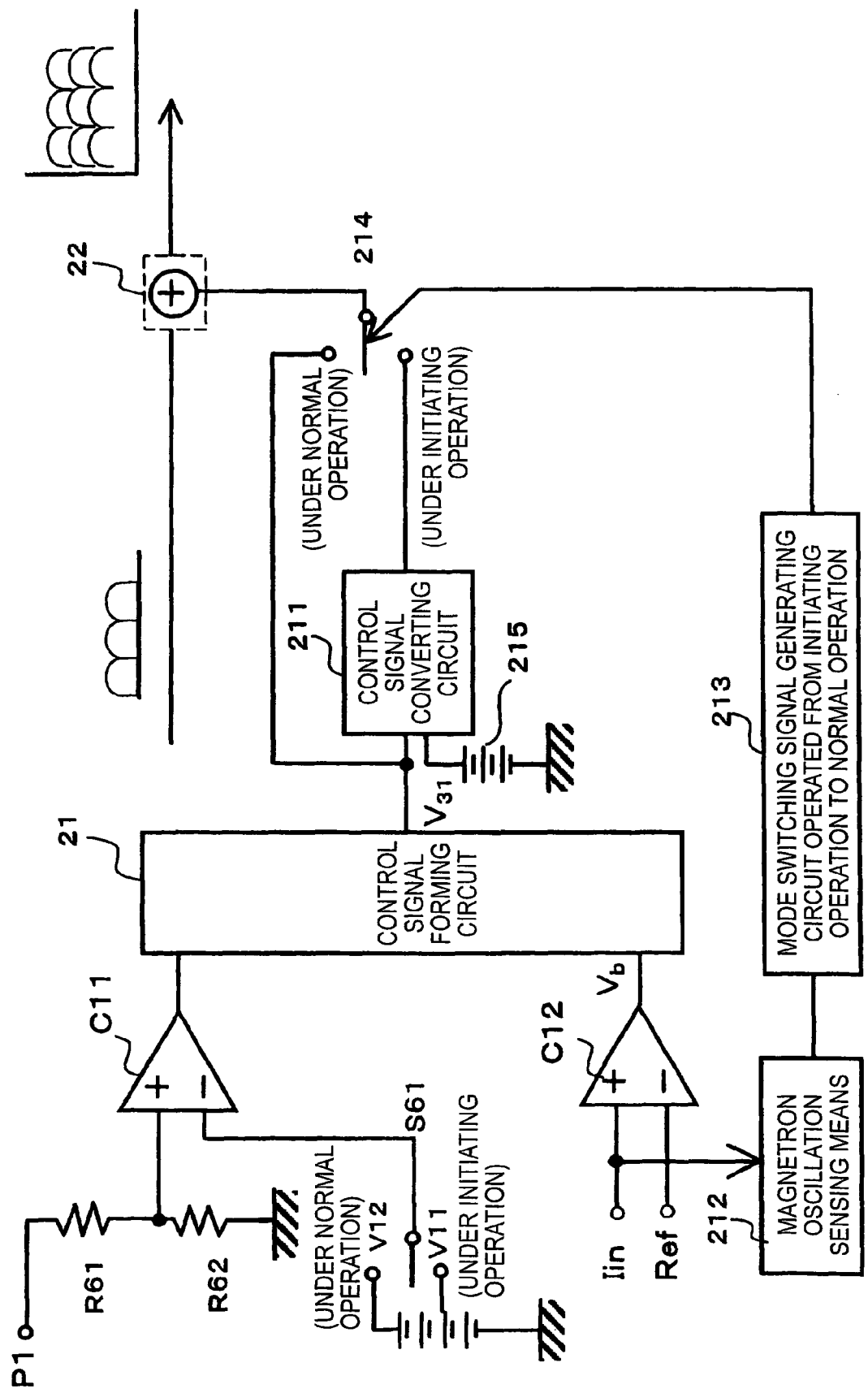
FIG. 6 is a circuit diagram for showing a detailed circuit portion related to the high frequency heating apparatus of FIG. 5 according to the present invention.

FIG. 6 is a circuit diagram for indicating a detailed circuit portion related to the high frequency heating apparatus of FIG. 5 according to the present invention. This circuit portion is featured by that the control signal converting circuit 211 is interposed between the control signal forming circuit 21 and the frequency modulated signal forming circuit 22.

In FIG. 6, symbols "C11" and "C12" show comparators; reference numeral 21 indicates the control signal forming circuit; reference numeral 22 represents the frequency modulated signal forming circuit; and reference numerals 211 to 215 show circuits which are newly employed in accordance with the present invention. That is, reference numeral 211 shows the control signal converting circuit; reference numeral 212 indicates a magnetron oscillation sensing means; reference numeral 213 denotes a mode switching signal generating circuit for switching an operation mode from an initiating operation to the normal operation; reference numeral 214 represents a mode switching switch for switching an operation mode from the initiating operation to the normal operation; and also, reference numeral 215 shows a DC power supply (battery).

A battery voltage switching switch S61 has been connected to the comparator C11. Assuming now that the positive potential of the capacitor (see FIG. 2) is equal to "P1", the battery voltage switching switch S61 applies such a potential "V1" to a plus-sided input terminal of the comparator C11, while this potential V1 is determined by dividing the potential P1 by a voltage dividing ratio between the resistor R61 and the resistor R62. On the other hand, the battery voltage switching switch S61 applies a low DC voltage "V11" to a minus-sided input terminal of the comparator C11 when the high frequency heating apparatus is operated under initiating operation mode, and applies a high DC voltage "V12" to this minus-sided input terminal of the comparator C11 when the high frequency heating apparatus is operated under the normal operation mode.

The comparator C12 corresponds to the same comparator employed in the conventional circuit. An input current "Iin" has been supplied to a plus-sided input terminal of this comparator C12, and a reference current "Ref" has been supplied to a minus-sided input terminal of the comparator C12.

As explained above, the input side of the control signal forming circuit 21 is equipped with a system of the comparator C11 and another system of the comparator C12. The system of the comparator C11 produces a control signal based upon a difference between a voltage to be applied to the magnetron 11 and a reference voltage. The system of the comparator C12 produces a control signal based upon a difference between an input current of an AC power supply and a reference current. Since an impedance of the magnetron 11 is high after the high frequency heating apparatus has been initiated until an oscillation of the magnetron 11 is commenced, the oscillation of this magnetron 11 is sensed by way of the voltage. When the oscillation of the magnetron 11 is commenced, the impedance of this magnetron 11 becomes low, and the primary-sided voltage of the transformer 2 (see FIG. 2) is controlled to a predetermined voltage value of the initiation mode due to the control function of the comparator C11 to which the lower DC voltage V1 is applied, so that the current "Iin" starts to be increased, which flows through the primary winding side of the transformer 2. As a consequence, the magnetron oscillation sensing means 212 senses that the above-described current Iin is increased, and thus, judges that the oscillation of the magnetron 11 is commenced.

The magnetron oscillation sensing means 212 owns such a recognition as to the oscillation of the magnetron 11 by sensing such a condition that the input current Iin exceeds a predetermined current value. Apparently, this sensing condition as to the oscillation of the magnetron 11 constitutes one example, but the present invention is not limited only to this sensing condition.

The mode switching signal generating circuit 213 generates such a switching signal based upon the oscillation signal of the magnetron 11 sensed by the magnetron oscillation sensing means 212. In response to this switching signal, both the mode switching switch 214 and the battery voltage switching switch S61 are switched from the initiating operation side to the normal operation side.

When the mode switching switch 214 is set to the initiating operation side, the control signal which is outputted from the control signal converting circuit 211 is selected, whereas when the mode switching switch 214 is set to the normal operation side, the control signal which is outputted from the control signal forming circuit 21 is selected, and then, the selected control signal is applied to the frequency modulated signal forming circuit 22.

Figure 7:
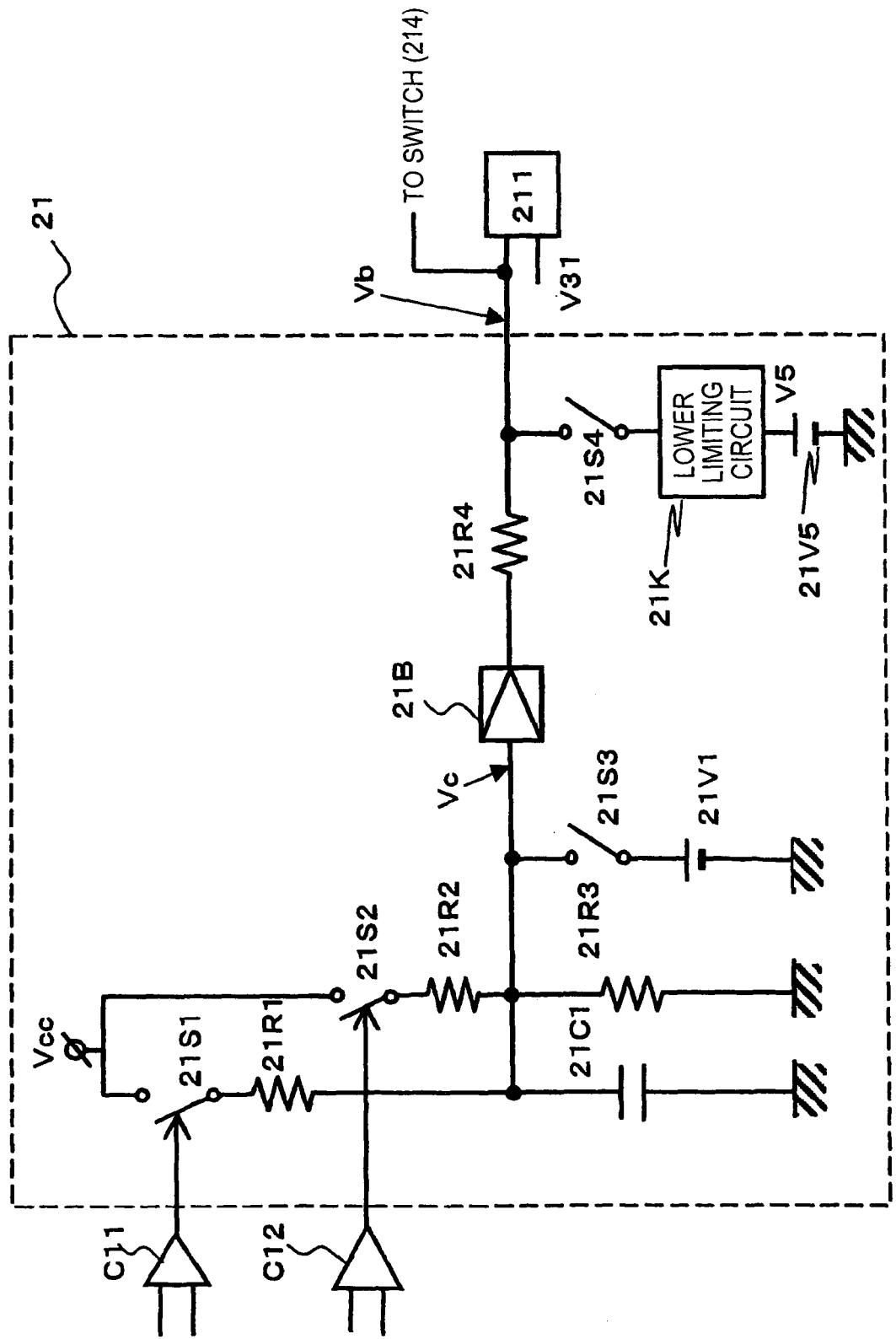
FIG. 7 indicates a concrete circuit example as to a control signal forming circuit of FIG. 6.
Figure 8:
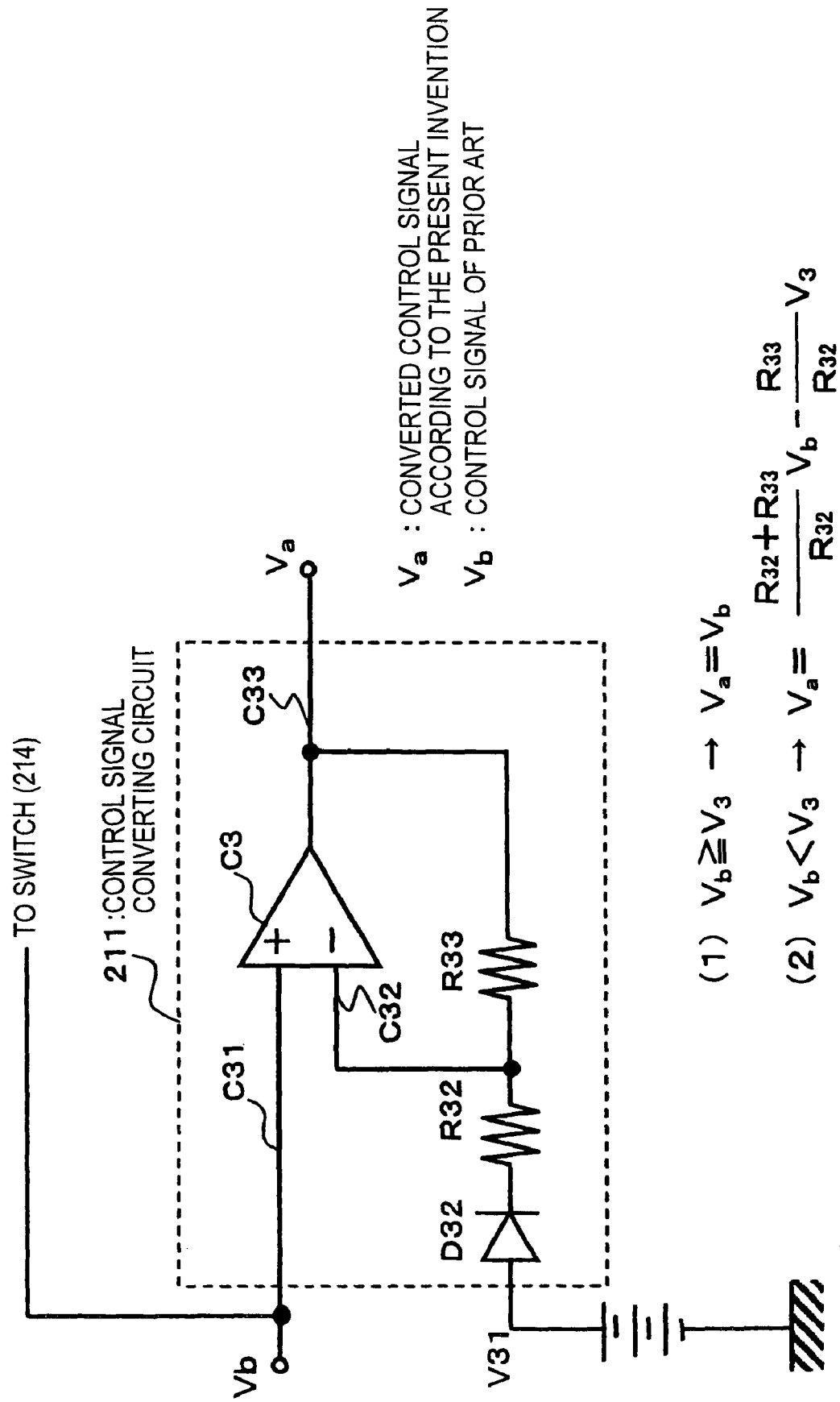
FIG. 8 shows a concrete circuit example as to a control signal converting circuit of FIG. 6.

FIG. 7 shows a concrete circuit example as to the control signal forming circuit 21 of FIG. 6, and FIG. 8 indicates a concrete circuit example as to the control signal converting circuit 211 of FIG. 6.

In FIG. 7, reference numeral 21B shows a buffer (buffering amplifier), symbol "Vb" denotes an output potential of the control signal forming circuit 21, and symbol "Vc" represents an input-sided potential of the buffer 21B.

Symbol "21S3" indicates a switch which is used to set the input-sided potential Vc of the buffer 21B to a potential "V1" (corresponding to potential "V1" of FIG. 10) of a DC power supply 21V1. Symbols "21S1" and "21S2" show switches which are turned ON/OFF in response to an output state of the comparator C11 and an output state of the comparator C12, respectively. These switches 21S1 and 21S2 are operated as follows: That is, when the input potentials of the comparators C11 and C12 are (potential of plus-sided input terminal>potential of minus-side input terminal), these switches 21S1 and 21S2 are turned ON (namely, closed) respectively in order that the input-sided potential Vc of the buffer 21B may be increased via the resistors 21R1 and 21R2. In other words, these switches 21S1 and 21S2 are operated so as to lower the voltage applied to the magnetron 11, or so as to lower the input current to this magnetron 11.

Both the capacitor 21C1 and the resistor 21R3 constitute a time constant circuit. This resistor 21R3 corresponds to such a discharge resistor which may discharge electrons of the capacitor 21C1, and may have a function capable of lowering the input-sided potential Vc of the buffer 21B. As a consequence, this resistor 21R3 increases the voltage to be applied to the magnetron 11, or increases the input current for the magnetron 11. It should be understood that instead of the above-explained discharge resistor 21R3, a constant current load may be alternatively used in this circuit.

The input-sided potential Vc of the buffer 21B is applied as the output potential Vb of the control signal forming circuit 21 via the buffer 21B and the resistor 21R4 to both the switch 214 and the control signal converting circuit 211.

When the high frequency heating apparatus is initiated (or when the high frequency heating apparatus is stopped), another switch 21S4 is closed so as to connect a lower limiting circuit 21k to the output side of the control signal forming circuit 21, so that such a limitation is made. That is, the potential Vb does not become lower than the potential V5 of the DC power supply 21V5.

FIG. 8 shows a concrete circuit example as to the control signal converting circuit 211 of FIG. 6.

In this drawing, symbol C13 shows an operational amplifier. The output Vb of the comparator C12 (see FIG. 6) has been applied to a plus-sided (noninverting) input terminal C31 of this operational amplifier C13, and a potential at a connection point between resistors R32 and R33 of a series circuit has been applied to a minus-sided (inverting) input terminal C32 of the comparator C13. The series circuit is constituted by the above-described resistors R32 and R33, and a diode R32. This series circuit has been inserted between the DC voltage V31 and an output-sided terminal C33 of the operational amplifier C13. It should also be understood that symbol "Va" indicates a control signal corresponding voltage which has been converted by the present invention, and symbol "Vb" indicates the control signal of the prior art, namely, such a control signal for reducing an error which is equal to a difference between a reference signal and a present value.

Operations of this control signal converting circuit 211 are defined as follows:
(1) When Va≧V31, it becomes Va=Vb.
(2) When Va<V31, it becomes the below-mentioned formula (1):

$$Va = (R32+R33)*Vb/R32 - R33*V3/R32 \quad \text{formula (1)}$$

Figure 3:
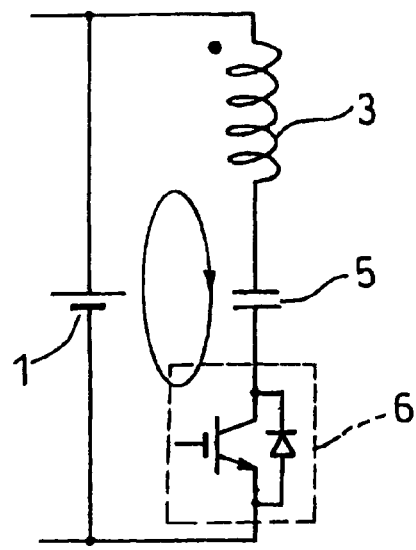
FIGS. 3(a) to 3(f) are diagrams for representing the respective modes in which the circuit of FIG. 2 is operated.
Figure 3:
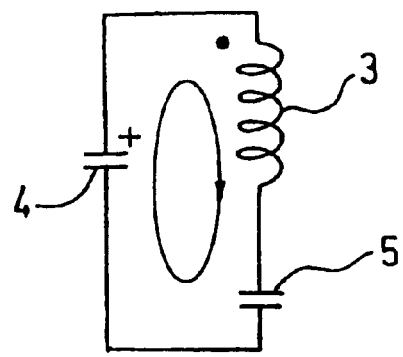
Figure 3:
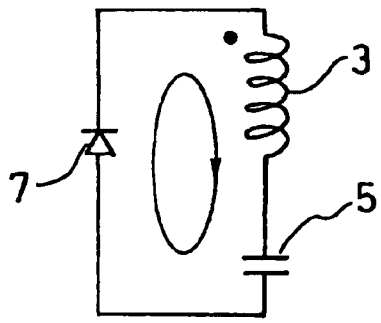
Figure 3:
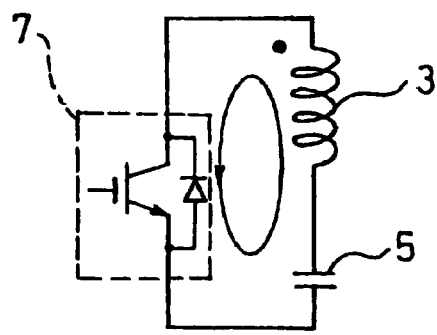
Figure 3:
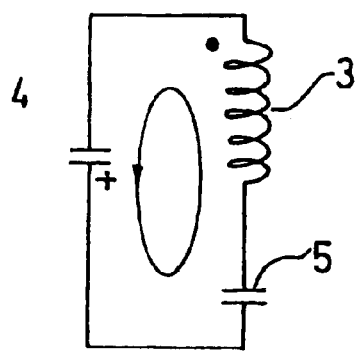
Figure 3:
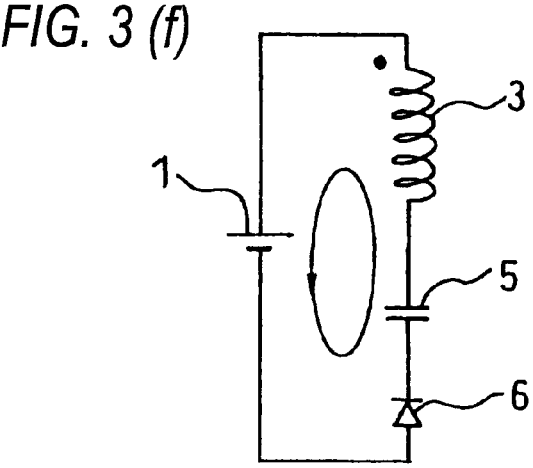
Figure 4:
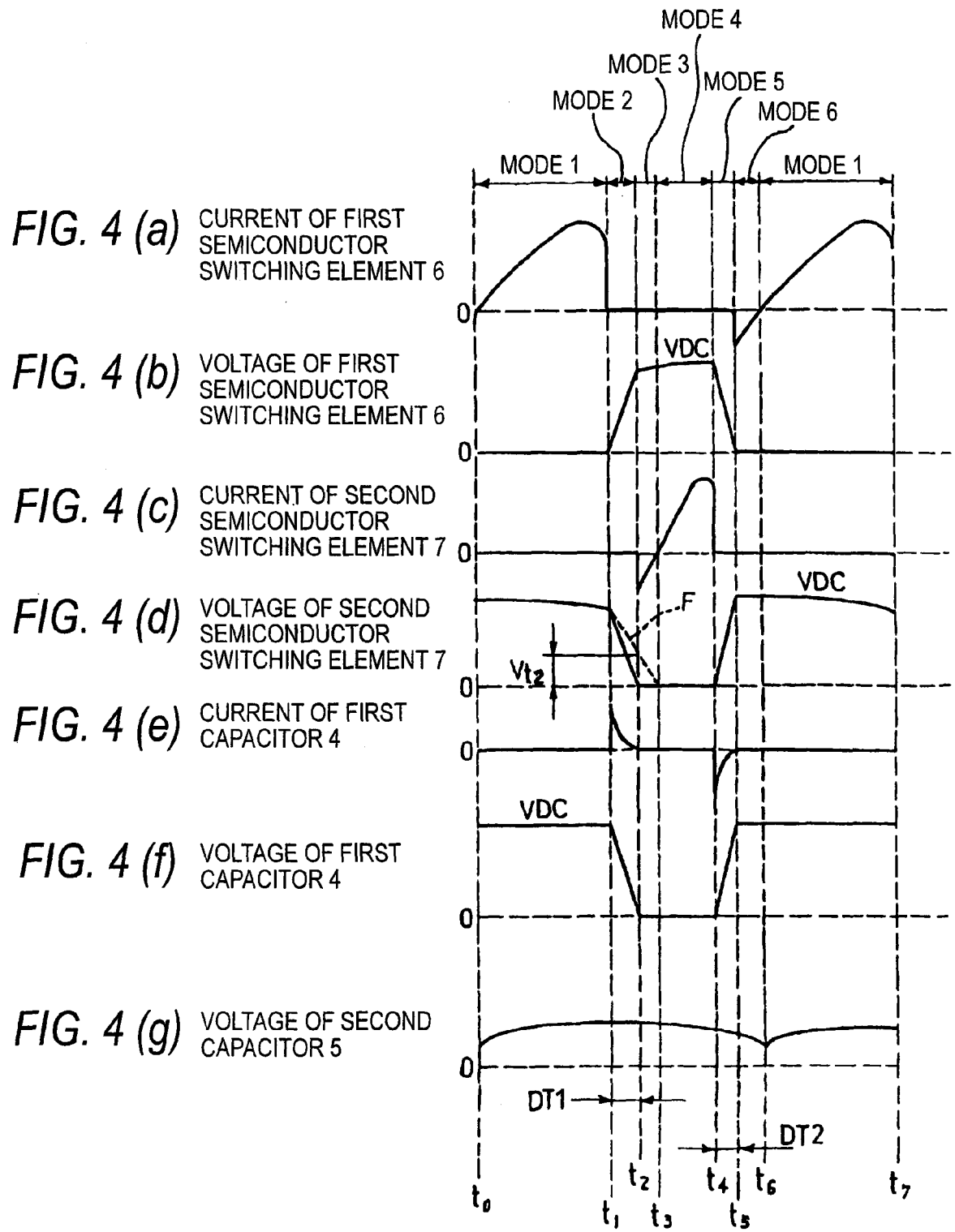
FIG. 4 shows a voltage/current waveform diagram as to the semiconductor switching elements employed in the circuit of FIG. 2.

It should also be noted that while the above-described control signal converting circuit 211 has been realized by employing the operational amplifier C3 in FIG. 3, the present invention is not limited only thereto, but the control signal converting circuit 211 may be alternatively realized by employing an amplifier having a comparing function. In this alternative case, such a circuit arrangement may be employed which is equivalent to the control signal converting circuit 211 of FIG. 8. That is, while the control signal outputted from the control signal forming circuit 21 is entered to one input terminal of this amplifier having the comparing function and the positive potential of the DC power supply V3 is entered to the other input terminal of the amplifier, a gain of the amplifier may be switched by conducting/non-conducting a diode as the comparing function.

Furthermore, such a circuit may be alternatively realized which is equivalent to the control signal converting circuit 211 shown in FIG. 8 by employing the normal amplifier.

In this alternative case, the control signal of the control signal forming circuit 21 is entered to one input terminal of this normal amplifier, whereas both a comparator and a switch are provided at the other input terminal of the normal amplifier, instead of the diode D32 shown in FIG. 8. The comparator compares the positive potential of the DC power supply V31 with the control signal outputted from the control signal forming circuit 21. The switch is used to switch a gain of the normal amplifier.

Also, as apparent from the foregoing description, if the above-described functions as to both the comparator and the switch for switching the gain may be replaced by such a circuit that the gain thereof is switched by setting "positive potential" as a boundary potential, then the above-explained functions may be realized.

FIG. 9(a) is a diagram for graphically representing a relationship between the control signal of the prior art and the converted control signal which has been obtained in accordance with the present invention. FIG. 9(b1) is a diagram for graphically showing a relationship between Va and Vb when the high frequency heating apparatus is initiated. FIG. 9(b2) is a diagram for graphically showing a relationship between the output of the switch 214 and Vb when the high frequency heating apparatus is operated under normal condition.

An abscissa of FIG. 9(a) indicates the control signal Vb of the prior art, an ordinate of FIG. 9(a) shows the converted control signal Va which is obtained in accordance with the present invention.

While there are a mode "I" and a mode "II" as the mode, Va<Vb in the mode I, whereas Va=Vb in the mode II.
(1) When Vb≦V3, it becomes Va=Vb.
(2) When Vb<V3, it becomes Va=(R32+R33)*Vb/R32−R33*V3/R32.

As to FIG. 9(b1), while the high frequency heating apparatus is initiated as indicated in FIG. 9(b1), the potential of the battery (215 of FIG. 7) and the potential of the battery (21V5 of FIG. 7) are set to V5 in such a manner that the control signal Va becomes equal to 0 when the output potential Vb of the control signal forming circuit 21 is nearly equal to the potential V5. As a result, even when the control signal Va just before the initiating operation is switched to the normal operation is saturated to be 0, the output potential Vb of the control signal forming circuit 21 is nearly equal to the potential V5, and the output potential of the switch 214 just after the initiating operation to the normal operation is commenced from the potential V5. Since the above-described potential setting operation is carried out, the potential V5>>0. As a result, it is possible to avoid that an excessively large input current flows, and also, an excessively high voltage is applied to the magnetron 11. It should also be understood that lowering of the output potential Va of the control signal converting circuit 211 implies increasing of the voltage which is applied to the magnetron 11, or increasing of the current which is inputted to the magnetron 11.

Next, a description is made of a temporal change as to the control signal from the initiating operation with employment of FIGS. 10(a) and 10(b).

FIGS. 10(a) and 10(b) are diagrams for graphically showing a temporal change as to the control signal from the initiating operation; FIG. 10(a) graphically shows the converted control signal Va obtained in accordance with the present invention, and FIG. 10(b) graphically indicates the control signal of the prior art.

In FIG. 10(a), first of all, just after the high frequency heating apparatus is initiated, the impedance of the magnetron 11 is not stable, but is changed between a finite impedance value and an infinite impedance value in an unstable manner. In order to avoid this unstable impedance change, while the Va2=Vb curve of the mode II shown in FIG. 9(a) is employed, the control signal is lowered up to V31 in a gentle inclination as indicated in Va2. As a result, the input current is suppressed, so that the voltage to be applied to the magnetron 11 may be reduced to a low voltage, and an excessively high voltage is not applied to the magnetron 11.

Subsequently, at a time instant when the control signal becomes lower than the voltage V31, since the control signal is rapidly decreased as illustrated as Va1 by employing the Va<Vb curve of the mode I shown in FIG. 9(a), the voltage to be applied to the magnetron 11 is quickly increased in order that the control signal may be quickly reached to the stable potential V6.

When the control signal has been reached to the stable potential V6 and then a predetermined time period has elapsed, the oscillation of the magnetron 11 can be at least stabilized.

After the magnetron 11 could be oscillated under stable condition, this stable oscillation is sensed by the magnetron oscillation sensing means 212 (FIG. 6), and thus, the respective switches 214 and S61 are switched from the initiating operation side to the normal operation side via the mode switching signal generating circuit 213.

Just before the above-described switching operations are carried out, the control signal V6 has been applied from the control signal converting circuit 211 to the switch 214 (FIG. 6). However, after the switching operations have been carried out, the control signal V6 is applied from the control signal forming circuit 21 to this switch 214. Then, the control signal Vb is decreased in a gentle manner, where as this control signal Vb is quickly reached to the stable potential V6 in the case of the present invention. As a result, at the time instant when the switching operations are carried out, the control signal Vb is still "V41" (namely, V41>V5, i.e., symbol V5 is limited potential). As a consequence, as shown in this drawing, a difference between this control signal Vb and a target voltage "Vm2" which is applied to the magnetron 11 becomes slightly small "ΔV11", an overshoot of the input current does not occur when the high frequency heating apparatus is switched from the initiating operation to the normal operation until the control signal Vb is reached to the target voltage Vm2.

To the contrary, as seen from FIG. 10(b), in the conventional circuit, since the control signal Vb is gently transferred in a monotone decreasing manner, a lengthy time is required until the control signal Vb is reached to the stable potential V6. Also, in the case that the switches are switched when the control signal Vb has been reached to the stable potential V6 and thereafter a predetermined time has elapsed, a difference between the control signal V6 and the target voltage Vm2 becomes a large potential difference "ΔV12", so that the input current may overshoot when the switching operations are carried out.

Figure 10:
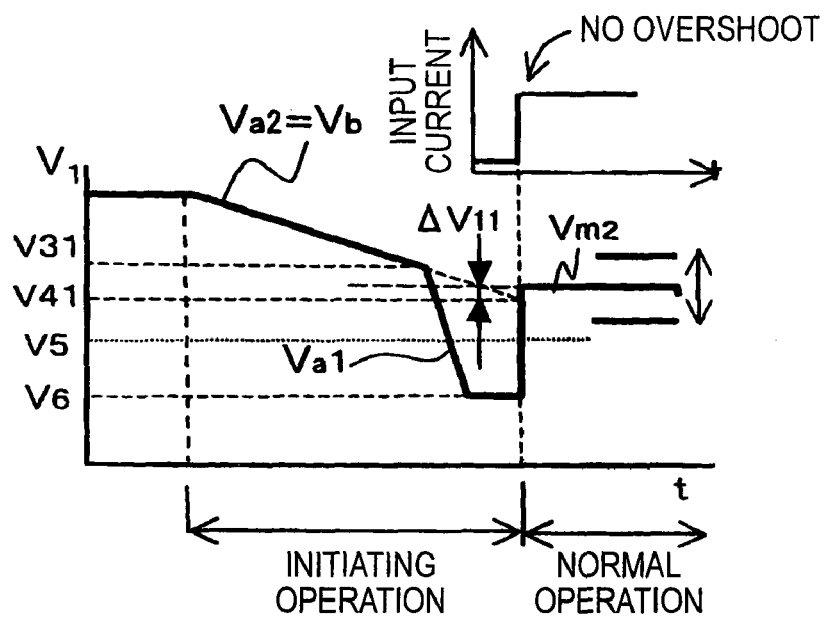
FIGS. 10(a) and 10(b) are graphic diagrams for indicating a temporal change of the control signal.
Figure 10:
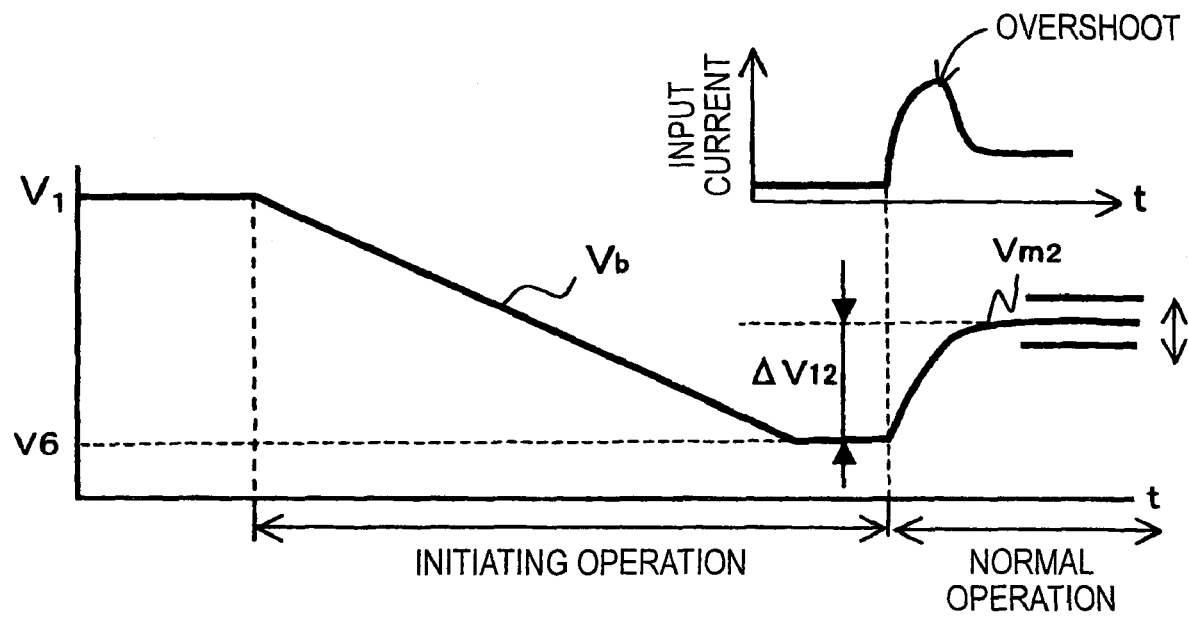
Figure 11:
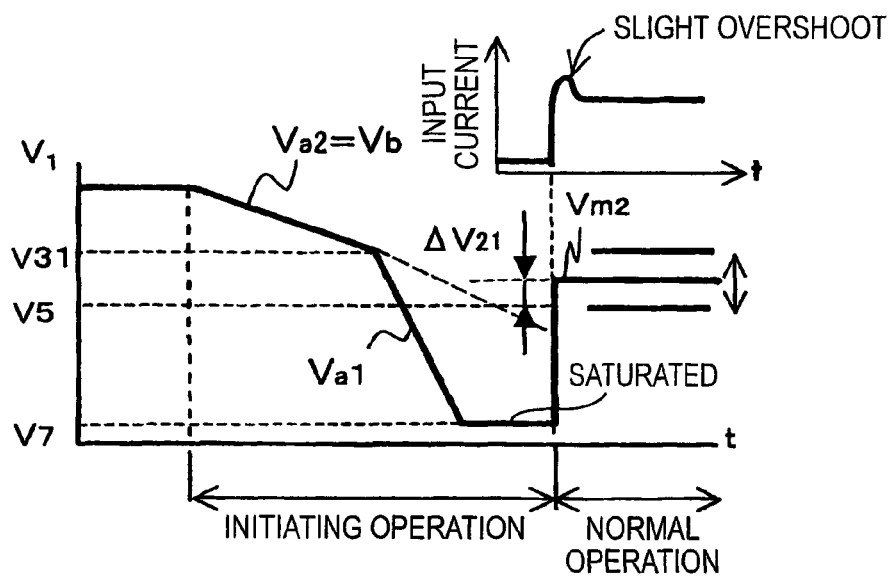
FIGS. 11(a) and 11(b) are graphic diagrams for indicating a temporal change of the control signal in the case that the control signal is saturated in FIG. 10.
Figure 11:
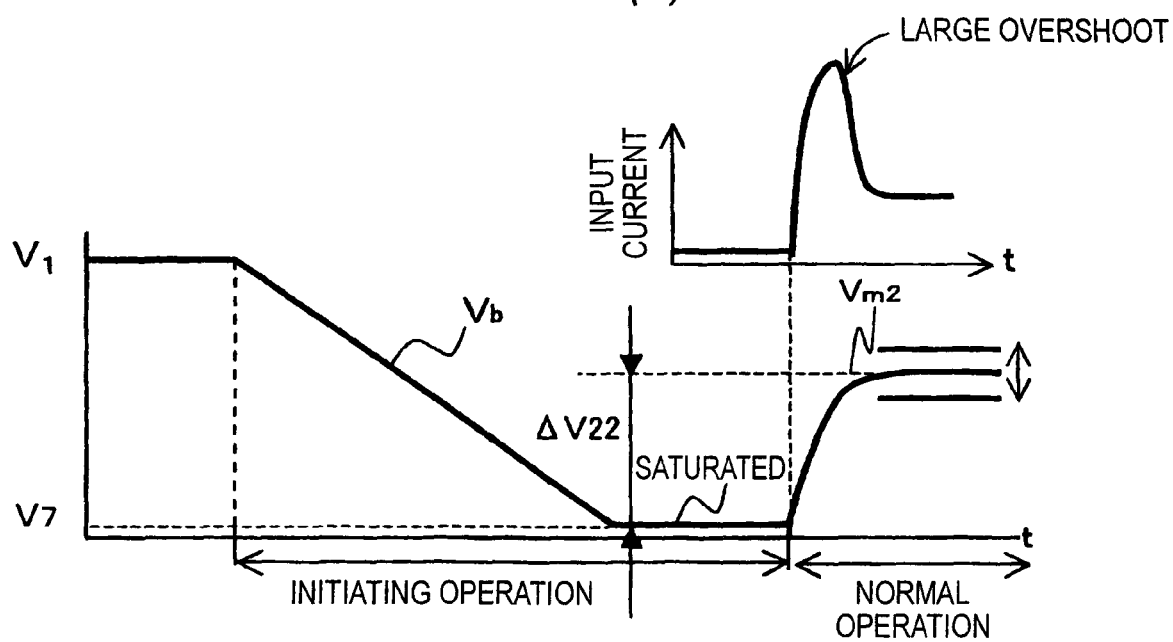

FIGS. 11(a) and 11(b) are diagram for graphically showing a temporal change as to the control signal in such a case that the control signal is saturated in FIG. 10; FIG. 11(a) graphically indicates the converted control signal Va which is obtained in accordance with the present invention; and FIG. 11(b) graphically indicates the control signal of the prior art.

In FIG. 11(a), since the control signal is lowered up to the voltage V31 in a gentle inclination, the input current is suppressed, so that the voltage to be applied to the magnetron 11 may be reduced to a low voltage, and an excessively high voltage is not applied to the magnetron 11. Subsequently, at a time instant when the control signal becomes lower than the voltage V31, the control signal is rapidly decreased to a saturated voltage as illustrated as Va1 by employing the Va<Vb curve of the mode I shown in FIG. 9(a), in order that the control signal may be quickly reached to the stable potential V7 (namely, saturated potential). When the control signal has been reached to the saturated potential V7 and then a predetermined time period has elapsed, the oscillation of the magnetron 11 can become stable, so that the respective switches 214 and S61 are switched from the initiating operation side to the normal operation side. In accordance with the present invention, the limited voltage "V5" is set in a half way that the control potential Vb is decreased, and the control potential Vb does not become lower than, or equal to this limited voltage V5.

As a consequence, when the control signal V7 outputted from the control signal converting circuit 211 before the above-described switching operations are carried out is instantaneously changed into the control signal Vb outputted from the control signal forming circuit 21 after the switching operations have been carried out, this control signal Vb is equal to the limited voltage V5. As a consequence, a difference between the control signal Vb and the target voltage Vm2 becomes ΔV21, namely is a small potential difference, only a small overshoot of the input current may occur after the control signal Vb has been changed from the control signal V7.

To the contrary, as seen from FIG. 11(b), in the conventional circuit, since the control signal Vb is continuously transferred in a monotone decreasing manner, a lengthy time is required until the control signal Vb is reached to the stable potential V7. Also, a difference between the saturated potential V7 and the target voltage Vm2 becomes a large potential difference "ΔV22", so that the input current may overshoot when the switching operations are carried out.

As previously explained, as seen from FIG. 10(a), such a function is provided by which even under such a condition that the output Va of the control signal converting circuit 211 is saturated to the minimum potential when the high frequency heating apparatus is initiated and the control signal Vb outputted from the control signal forming circuit 21 becomes V7, the lower limit voltage may be limited to the potential V5 (namely, potential to be applied to magnetron 11 is maintained to predetermined potential). As a result, when the control signal is switched to the target voltage Vm2 during the normal operation, since there is no such a large potential difference between the target voltage Vm2 and the voltage V5, the control signal V7 can be immediately switched to the control signal Vb, so that an overshoot phenomenon can hardly occur. In other words, the level of the signal which is entered to the frequency modulated signal forming circuit 22 just after the initiating operation has been switched to the normal operation is commenced from the voltage V5. As a consequence, the amount of the overshoots produced in the input current Iim can be reduced, as compared with that of the conventional system in which the signal level is commenced from the potential Va which has been saturated to the minimum potential.

As previously explained, in accordance with the present invention, the control signal converting circuit 211 outputs the same value as the output (control signal) Vb of the control signal forming circuit 21 until the control signal Va is reached to the predetermined potential V31, and switches the inclination of the output Vb after the control signal Va has exceeded the predetermined potential V31 in order to rapidly direct the control signal Va to the lower stable region. If the control signal Va can be quickly stabilized, then the oscillation of the magnetron 11 can be rapidly stabilized, the switching operation from the initiating operation side to the normal operation side can be quickly carried out. As a consequence, the control signal Va can be switched to the control signal Vb unless this control signal Vb is not lowered, and since the difference between the control signal Vb and the target voltage Vm2 may become small, the overshoot phenomenon can hardly occur.

In the above-described explanations with reference to FIG. 10, the potential V1 has been the positive, the control signal Vb has been dropped toward the zero potential in connection with the time elapse, and the converted control signal Va has been further suddenly dropped. This is because the explanation has been made in the control system of the positive polarity. Conversely, in the case of the control system of the negative polarity, the control signal Vb starts from the negative potential V1, and the control signal Vb is increased to be directed toward the zero potential in connection with the time elapse, and the converted control signal Va is further rapidly increased.

The collector voltages VQ8C and VQ7C of the transistors Q8 and Q7 are transferred from the dead time forming circuit 24 to the rectangular wave forming circuit 25 respectively (see FIG. 5). Also, the triangular wave output of the oscillating circuit 23 is transferred to the rectangular wave forming circuit 25.

The rectangular wave forming circuit 25 owns two sets of comparators 251 and 252. The collector voltage VQ8C of the transistor Q8 is applied to an inverting input terminal (−) of the comparator 251; the collector voltage VQ7C of the transistor Q7 is applied to a noninverting input terminal (+) of the comparator 252; and also, the triangular wave output of the oscillating circuit 23 is applied to both a noninverting input terminal (+) of the comparator 251 and an inverting input terminal (−) of the comparator 252.

Each of the comparators 251 and 252 produces no output (namely, zero potential) in the case that a potential of the noninverting input terminal (+) is lower than a potential of the inverting input terminal (−), and also, produces an output (namely, high potential) while a potential of the noninverting input terminal (+) exceeds a potential of the inverting input terminal (−).

A dead time "DT" may be classified into the below-mentioned three categories:

(1): A dead time DT is constant (fixed) irrespective of a switching frequency.

This fixed (constant) dead time DT has been conventionally employed.

In contrast to this fixed dead time, the following dead times "DT" are variable in response to a switching frequency.

(2): When a switching frequency exceeds a predetermined switching frequency, a dead time DT is increased in a continuous manner in conjunction with an increase of the switching frequency.

(3): When a switching frequency exceeds a predetermined switching frequency, a dead time DT is increased in a stepwise manner in conjunction with an increase of the switching frequency.

Then, the control signal converting circuit 211, according to the present invention, may be applied to any of the above-explained dead times (1) to (3).

FIG. 12 is a diagram for explaining a basic idea for forming such a dead time which is continuously increased in connection with an increase of a switching frequency when the switching frequency exceeds the predetermined switching frequency described in the above-described item (2); FIG. 12(a) is a diagram for explaining a relationship between the respective outputs of the oscillating circuit 23 and of the dead time forming circuit 24 and the output of the rectangular wave forming circuit 25; and FIG. 12(b) is a diagram for explaining such a basic idea that a dead time DT is not changed at a switching frequency lower than, or equal to the predetermined switching frequency.

In FIG. 12, in a time period before a time instant "t1", in the comparator 252 (refer to FIG. 5), since a potential VQ7C of the noninverting input terminal (+) exceeds a potential of the triangular wave of the inverting input terminal (−), the semiconductor switching element has been turned ON (output 1). At the same time, in the comparator 251, since a potential of the triangular wave of the noninverting input terminal (+) lower than a potential VQ8C of the inverting input terminal (−), the semiconductor switching element has been turned OFF (output 0).

(1). At the time instant t1, since the potential VQ7C of the noninverting input terminal (+) becomes lower than the potential of the triangular wave of the inverting input terminal (−), the comparator 252 produces an output 0.

(2). In a time period from t1 to t4, the comparator 252 continuously produces the output 0.

(3). At a time instant t2, since the potential of the triangular wave of the noninverting input terminal (+) becomes higher than the potential VQ8C of the inverting input terminal (−), the comparator 251 produces the output 1.

(4). In a time period from the time instants t2 to t3, the comparator 251 continuously produces the output 1.

(5). At a time instant t3, since the potential of the triangular wave of the noninverting input terminal (+) becomes lower than the potential VQ8C of the inverting input terminal (−), the comparator 251 produces the output 0.

(6). At the time instant t4, since the potential VQ7C of the noninverting input terminal (+) becomes higher than the potential of the triangular wave of the inverting input terminal (−), the comparator 252 produces the output 1.

(7). In a time period from the time instants t4 to t5, the comparator 252 continuously produces the output 1.

(8). At the time instant t5, since the potential VQ7C of the noninverting input terminal (+) becomes lower than the potential of the triangular wave of the inverting input terminal (−), the comparator 252 produces the output 0.

(9). In a time period from the time instants t3 to t6, the comparator 251 continuously produces the output 0.

These comparators 251 and 252 will repeat similar operations subsequently.

The outputs of the comparators 251 and 252 are applied to the switching element (IGBT) driving circuit 26, and the switching elements 6 and 7 are turned ON and OFF at the same timing.

As previously explained, the time periods t1 to t2, t3 to t4, and t5 to t6, during which the switching elements 6 and 7 are simultaneously turned OFF, are obtained as a "dead time DT."

In the prior art system, the time period of the dead time DT is constant (namely, fixed) irrespective of the frequency. As an improved technical idea, this dead time DT may be varied in response to a switching frequency. In this embodiment, when the switching frequency is lower than a predetermined switching frequency "f1", the dead time DT is set to a preselected non-changed value (otherwise, slightly increased value), whereas when the switching frequency is higher than the predetermined switching frequency f1, the dead time DT is increased.

As a consequence, a description is made of such a basic idea that when the switching frequency is lower than the predetermined switching frequency f1, the dead time DT becomes the predetermined non-changed value with reference to FIG. 12(b).

In this drawing, when the switching frequency is high (indicated by solid line), as previously explained in FIG. 12(a) by employing the potentials VQ8C and VQ7C of the solid lines and the triangular wave, such a time period between the time instant t1 and the time instant t2 may be secured as the dead time DT between the potentials VQ8C and VQ7C, and the triangular wave. At the time instant t1, the potential VQ7C becomes lower than the potential of the triangular wave, and the comparator output becomes 0. At the time instant t2, the potential of the triangular wave becomes higher than the potential VQ8C, and the comparator output becomes 1.

Then, when the switching frequency becomes low, the above-described triangular wave as shown by the solid line becomes a triangular wave as indicated by a dot line, and an inclination of this triangular wave becomes gentle. As a consequence, in accordance with the present invention, in order to obtain the same dead time DT as the above-explained dead time DT, the respective offset voltages are determined in such a manner that the potentials of the triangular wave may become such potentials "VQ7C1" and "VQ8C1" which pass through cross points "C1" and "C2" with respect to perpendiculars which are drawn from the time instant t1 and the time instant t2 toward the triangular wave indicated by the dot line. Since resistors R1 and R7 (see FIG. 13) are constant resistance values, currents "I8" and "I7" which may produce such offset voltages are supplied to the respective resistors R8 and R7.

Since the above-described switching operation is carried out, even when the switching frequency is changed so that the triangular wave is changed from the wave indicated by the solid line to the wave indicated by the dot line, the time instant t1 and the time instant t2, at which the triangular wave indicated by the dot line intersects the two potentials VQ7C1 and VQ8C1, may become the same time instants of the above-explained triangular wave indicated by the solid line. As a result, this dead time DT is the same as the above-explained dead time DT.

Figure 13:
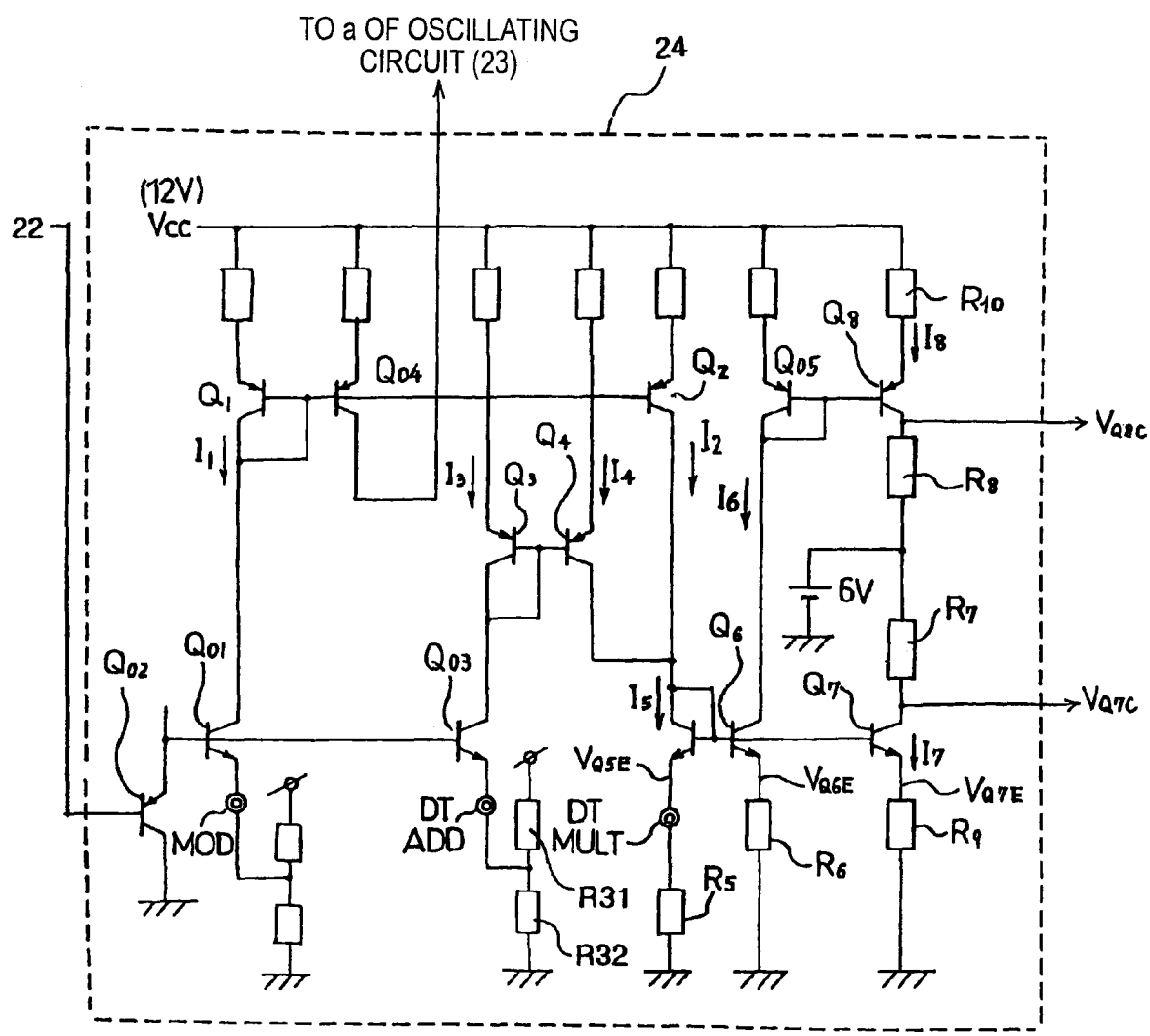
FIG. 13 is a circuit diagram for showing a concrete example of the variable dead time forming circuit according to the present invention.

FIG. 13 is a circuit diagram for showing a concrete example as to the dead time forming apparatus 24.

Figure 17:
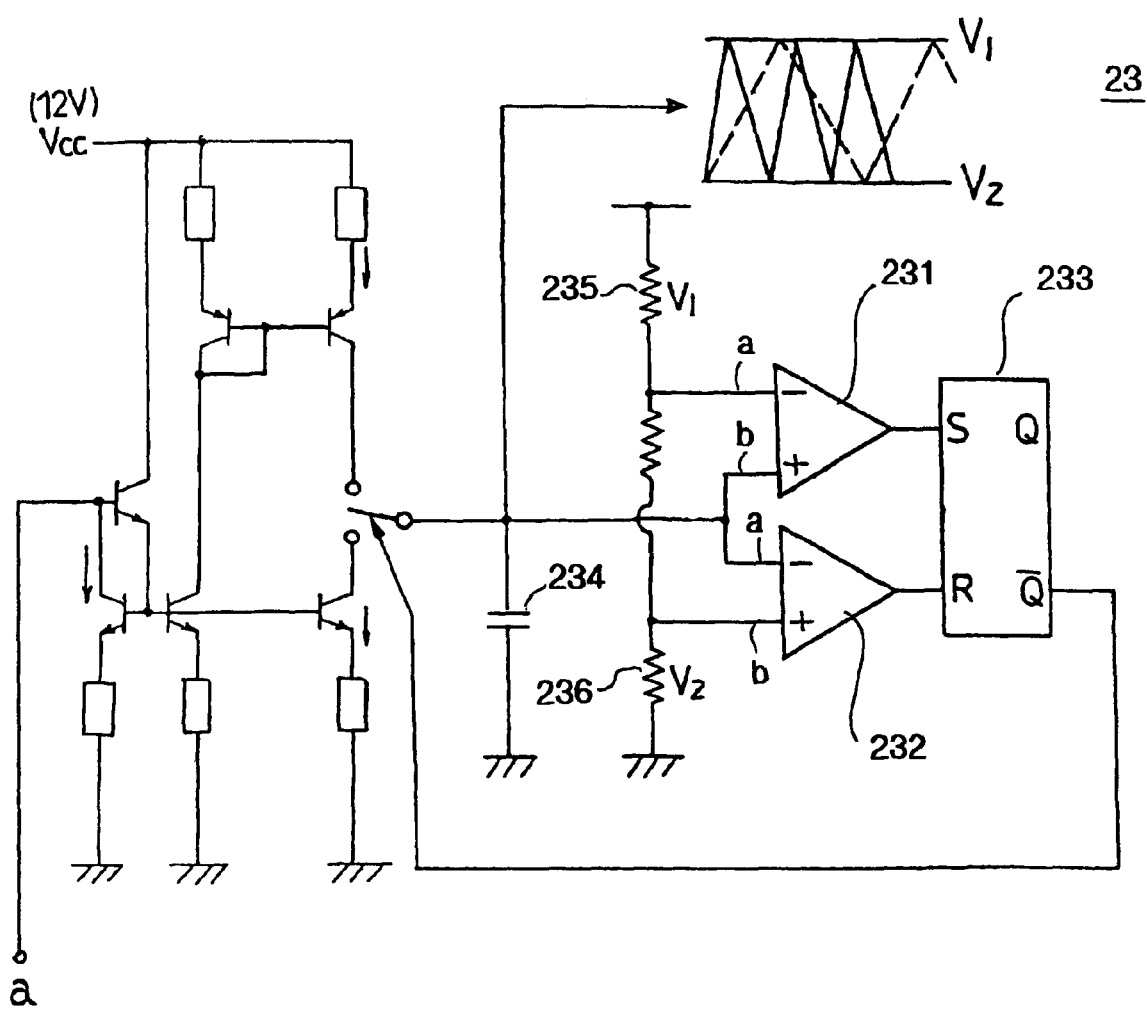
FIG. 17 is a diagram for indicating one example of the oscillating circuit of FIG. 5.

In this drawing, symbols Q01, Q02, and Q1 to Q8 show transistors; and symbols R1 to R10 indicate resistors. It is so assumed that currents flowing through the transistors Q1, Q3, Q4, Q5, Q6, Q7, and Q8 are defined as I1, I3, I4, I5, I6, I7, and I8, respectively; emitter potentials of the transistors Q5, Q6, Q7 are defined as VQ5E, VQ6E, VQ7E, respectively; and also, collector potentials of the transistors Q7 and Q8 are defined as VQ7C and VQ8C, respectively. A current mirror circuit has been constituted by the transistors Q1 and Q2. Similarly, a current mirror circuit has been constituted by the transistors Q1 and Q04; a current mirror circuit has been formed by the transistors Q3 and Q4; and a current mirror circuit has been formed by the transistors Q05 and Q8. An output of the transistor Q04 is supplied to the oscillating circuit 23 (FIG. 17).

Also, the emitter sides of the transistors Q1 and Q3 have been connected to Vcc, and the collector sides thereof have been connected to the collector sides of the transistors Q01 and Q03 respectively; the emitter sides of the transistors Q01 and Q03 have been connected to a terminal "MOD" and a terminal "DTADD" respectively; and the terminal MOD and the terminal DTADD have been grounded via voltage dividing resistors respectively. The base sides of the transistors Q01 and Q03 have been connected to the emitter side of the transistor Q02, and the collector side of the transistor Q02 has been grounded. A control voltage of an oscillation frequency which corresponds to the output of the frequency modulated signal forming circuit 22 (see FIG. 5) is applied to the base of the transistor Q02.

A series connection circuit made of a resistor R10, a resistor R8, a resistor R7, and a resistor R9 has been provided between the power supply voltage VCC (in this circuit, 12 V) and the earth from the Vcc side. Also, the transistor Q8 has been provided between the resistor R10 and the resistor R8, while the emitter side thereof is connected to the resistor R10 and the collector side thereof is connected to the resistor R8. Also, the transistor Q7 has been provided between the resistor R9 and the resistor R7, while the emitter side thereof is connected to the resistor R9 and the collector side thereof is connected to the resistor R7. A voltage of ½ Vcc (in this circuit, 6V) has been applied between the resistor R8 and the resistor R7. While this voltage 6 V is set as a center voltage, a voltage drop of the resistor R8 at the upper side is I8×R8, and a voltage drop of the resistor R7 at the lower side is I7×R7. Both the current I8 and the current I7 are varied, depending upon a frequency. As a result, the voltage drops for the resistors R7 and R8 are varied in response to the frequency, so that while the voltage of 6 V is set as the center, both the offset voltages VQ8C and VQ7C are varied.

A base voltage of the transistor Q05 which constitutes the current mirror circuit is applied to the base of the transistor Q8. If the respective characteristics of the transistors Q05 and Q8 are equal to each other and the respective resistance values thereof are also equal to each other, then the following equations are given:

$$I6=I7=I8, I3=I4.$$

Note that the present invention is not limited only to I1=I2, I3=I4, I6=(I7=I8), but may be modified. Namely, these currents may have a direct relationship.

It should be noted that the condition of I7=I8 is required.

Next, a description is made of operations of the dead time forming circuit 24, namely, when the switching frequency is lower than, or equal to the predetermined switching frequency, the dead time "DT" is not changed, or is slightly changed, whereas when the switching frequency is higher than, or equal to the predetermined switching frequency, the dead time "DT" is increased.

1), The reason why the dead time DT is not changed (or slightly increased) within such a range that the current I3 does not flow (namely, a range in which oscillation frequency is low) is given as follows:

In the range where the current I3 does not flow, the following conditions can be established:

$$I1=I2=I5,$$

$$VQ5E=VQ6E=VQ7E, \text{ and}$$

$$I5*R5=I6*R6=I7*R9=I1*R5$$

The currents I8 and I7, which flow through the transistors Q8 and Q7, are given as follows:

$$I8=I6=I1*(R5/R6)$$

$$I7=I1*(R5/R9)$$

The offset voltages VR8 and VR7 are given as follows:

$$VR8=I8*R8=\{I1*(R5/R6)\}*R8$$

$$=I1*R5*(R8/R6)$$

$$VR7=I1*R5*(R7/R9)$$

Since the collector voltages VQ8C and VQ7C of the transistors 8 and 7 are calculated by adding/subtracting the above-described offset voltages VR8 and VR7 with respect to 6 V, these collector voltages are expressed by the following formula (1)=

$$VQ8C=6V+VR8=6V+I1*R5*(R8/R6)$$

$$VQ7C=6V-VR7=6V-I1*R5*(R7/R9) \quad (1)$$

As previously explained, since the currents I8 and I7 within the range where the frequency is low (dead time may be made constant) are directly proportional to the charge/discharge current I1 of the triangular wave, these currents I8 and I7 may be employed as such current values obtained by multiplying the charging/discharging current I1 of the triangular wave by several values. This may be realized by employing such a mirror circuit as shown in FIG. 13. That is, while both the currents I6 and I8 are set to a certain relationship with respect to the current I5, the current I6 is made equal to the current I8. While the current I7 is set to a certain relationship with respect to the current I5, the current I7 is made equal to the current I8.

Figure 14:
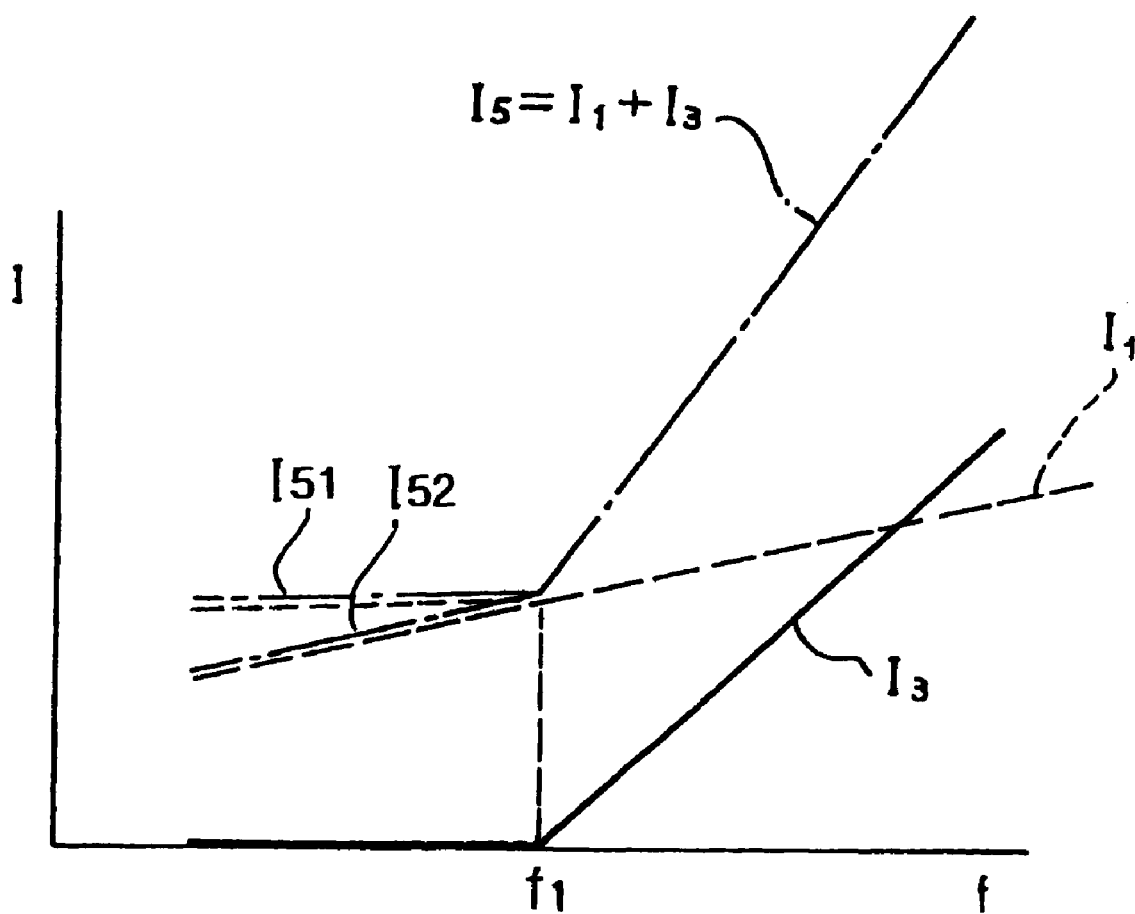
FIG. 14 is a graphic representation for showing a current-to-frequency characteristic owned by the variable dead time forming circuit.

FIG. 14 graphically shows a current-to-frequency characteristic owned by the dead time circuit 24.

In this drawing, symbols I1, I3, I5 show currents which flow through the transistors Q1, Q3, Q5 of FIG. 13, respectively. The current I5 is equal to I1+I3.

In the range where an oscillating frequency is lower than, or equal to the predetermined switching frequency f1, the current I1(I5) becomes constant (I51), or is slightly increased (I52). In the range where an oscillating frequency is higher than, or equal to the predetermined switching frequency f1, while the predetermined switching frequency f1 is employed as the inflection point, since the current I3 sharply starts to flow, a total current I5 (=I3+I1) is rapidly increased.

As can be understood from the above-described formula (1) as to the offset voltages VQ8C and VQ7C, and also, the current-to-frequency characteristic of FIG. 14, in such a range that the oscillating frequency is low, as to VQ8C and VQ7C, offset voltages may be obtained which are directly proportional to the charging/discharging current I1 of the capacitor of the oscillating circuit 23. As a consequence, as shown in FIG. 14, if the charging/discharging current I1 becomes constant, then the dead time DT becomes constant. Also, if the charging/discharging current I1 is slightly increased, then the dead time DT is slightly increased.

2). To the contrary, in the range where the current I1 flows (namely, range where oscillating frequency is high), the dead time DT is varied. This reason is explained in the below-mentioned explanations.

In FIG. 13, in the range where the oscillating frequency is low, the current I3 is equal to 0, where as in the range where the oscillating frequency is high, the current I3 may flow in the below-mentioned manner. In other words, when an emitter potential of the transistor Q02 of an oscillating frequency control voltage is lower than a potential at a contact point DTADD, the transistor Q3 which is connected to the terminal DTADD is not turned ON (as a result, current I3 does not flow). However, when an emitter potential of the transistor Q02 of the oscillating frequency control voltage is higher than a potential at the contact point DTADD, since the transistor Q3 which is connected to the terminal DTADD is turned ON, the current I3 starts to flow. In FIG. 14, in the range where the oscillating frequency is lower than, or equal to the predetermined switching frequency f1, the current I51 becomes constant, or the current I52, is slightly increased. In the range where the oscillating frequency is higher than, or equal to the predetermined switching frequency f1, the current I3 which has been 0 starts to rapidly flow. As a result, the current I5 is equal to I1+I3.

In the range where the current I3 flows, the below-mentioned formulae is given:

$$I5=I2+I4=I1+I3$$

$$I5*R5=I6*R6=I7*R9=(I1+I3)*R5$$

As a consequence, the collector voltages VQ8C and VQ7C of the transistors Q8 and Q7 are given by the below-mentioned formulae (2):

$$VQ8C=6V+VR8=6V+(I1+I3)*R5*(R8/R6)$$

$$VQ7C=6V-VR7=6V-(I1+I3)*R5*(R7/R9) \quad (2)$$

A similar effect may be achieved also in such a circuit formed by omitting the third capacitor 5 from the circuit shown in FIG. 3(*a*) by setting the capacitances as to the first capacitor 41 and the second capacitor 42 to proper capacitance values.

As can be understood from the above-explained formula (2) as to the collector voltages VQ8C and VQ7C and the relationship of FIG. 14, as to the collector voltages VQ8C and VQ7C, such offset voltages may be obtained which are commonly directly proportional to the current I3. As indicated in FIG. 14, when the current I3 is rapidly increased, since the collector potentials VQ8C and VQ7C of the transistors Q8 and Q7 become a function of the current I5 (=I1+I3), the current I5 is increased. In connection with this increase of the current I5, the collector potentials VQ8C and VQ7C of the transistors Q8 and Q7 are increased. Then, when the respective collector potentials VQ8C and VQ7C are increased, the collector potential VQ8C ascends higher than the position shown in FIG. 12, and the collector potential VQ7C descends lower than the position shown in FIG. 12, so that a cross point between the triangular wave and the collector potential VQ7C leads, which corresponds to a starting point of the dead time DT, and a cross point between the triangular wave and the collector potential VQ8C delays, which corresponds to a ending point of the dead time DT. As a result, the width of the dead time DT is made wider than the width shown in the drawing.

Figure 16:
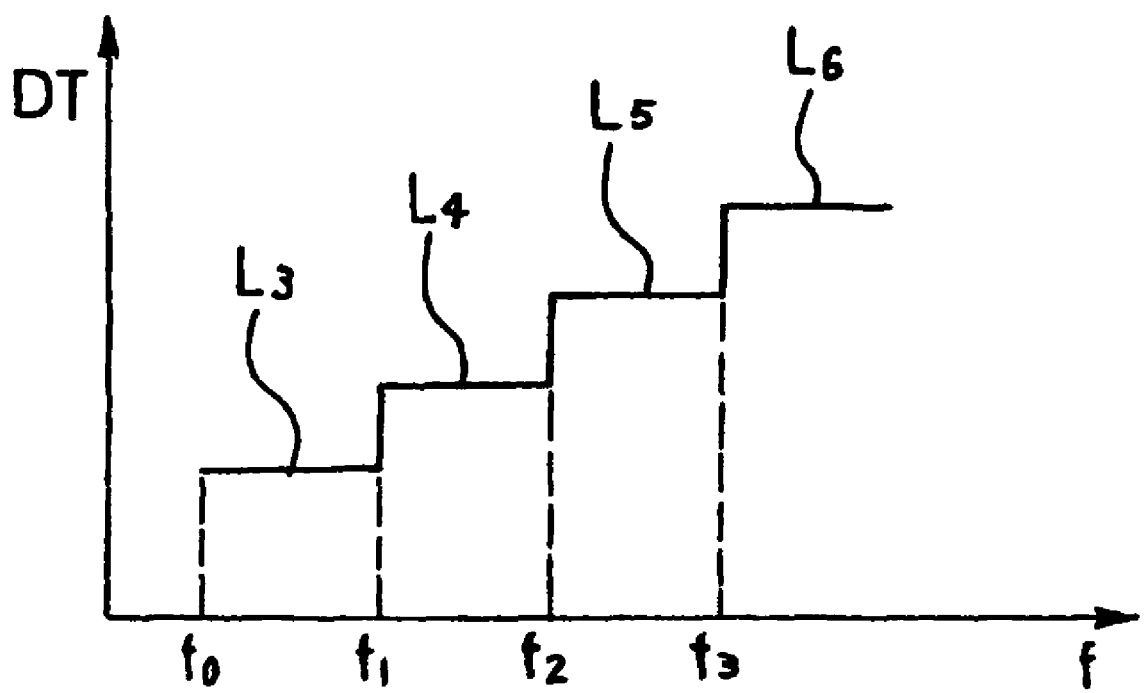
FIG. 16 is a graphic representation for explaining a second embodiment of the present invention in which a dead time DT is variable.

FIG. 15 indicates various examples as to the above-described item (2) "when the switching frequency exceeds the predetermined switching frequency, the dead time DT is continuously increased in connection with the increase of the switching frequency." FIG. 16 shows an example as to the above-described item (3) "when the switching frequency exceeds the predetermined switching frequency, the dead time DT is continuously increased in the step wise manner in connection with the increase of the switching frequency."

In FIG. 15(*a*), the dead time DT is made constant (otherwise, is slightly increased) at a switching frequency lower than, or equal to the predetermined switching frequency "f1", whereas the dead time DT is rapidly increased at a switching frequency higher than, or equal to the predetermined switching frequency "f1."

FIGS. 15(*b*1), 15(*b*2) and 15(*b*3) show a modified example of FIG. 15(*a*).

FIG. 15(*b*1) indicates such a graphic representation that either the constant value or the slightly increased value of the above-explained dead time at the switching frequency lower than, or equal to the predetermined frequency f1 of FIG. 15(*a*) is variable such as L11, L12, L13, and also, the rapidly increased value L2 of the dead time DT at the switching frequency higher than, or equal to the predetermined switching frequency f1 is variable such as L21, L22, L23.

This value varying operation may be realized by changing a ratio of the resistor R5 to the ratio R6 of the terminal "DTMULTI" of FIG. 13. In other words, since I5*R5=I6*R6, if the ratio of the resistor R5 to the resistor R6 is changed, then the ratio of the current I5 to the current I6 is also changed. Since the current I6 determines the values of the currents I7 and I8, if the ratio of the current I5 to the current I6 is changed, then the values of the currents I7 and I8 with respect to the current I5 are also changed, so that the offset voltage from 6 V is also changed. As a result, the dead time DT is also changed. If the above-explained circuit arrangement is employed, then the dead time DT may be varied even in the same frequency.

FIG. 15(b2) shows such a graphic representation that an inclination of the dead time DT is variable as L24, L25, L26 at the predetermined switching frequency f1 of FIG. 15(a).

This inclination is determined based upon a combined resistance value of a resistor R31 and a resistor R32 located at upper/lower positions of the contact DTADD. When the combined resistance value is large, a current slightly flows from the power supply voltage Vcc, so that the inclination of the dead time DT becomes small (L26). Conversely, when the combined resistance value is small, a current largely flows from the power supply voltage Vcc, so that the inclination of the dead time DT becomes large (L24). In other words, when the current I3 largely flows, both the currents I7 and I7 are largely increased. As a result, voltage drops across the resistors R7 and R8 are increased, and thus, the offset voltage from 6 V is increased. As a consequence, the collector voltages of the transistors Q8 and Q7 are increased in accordance with the above-explained formula (2).

It should be noted that if the oscillating frequency becomes high, then the dead time DT is effected along the narrowing direction. However, the increase of the offset voltage may be effected in such a direction along which the dead time DT may be furthermore prolonged.

FIG. 15(b3) shows a graphic representation that the predetermined switching frequency f1 which constitutes the inflection point of FIG. 15(a) is varied as "f0", and "f2."

This inflection point may be changed by a resistance ratio of the resistors R31 and R32 at the upper/lower positions of the terminal DTADD. In other words, when the oscillating frequency control voltage applied to the base of the transistor Q02 exceeds such a voltage which is determined by this resistance ratio, the current I3 starts to flow. As a result, this resistance ratio of the resistors R31 and R32 constitutes the inflection point. If the resistor R31>the resistor R32, then the voltage determined by the resistance ratio is low, so that the current I3 starts to flow in an earlier stage. When the current I3 flows, the currents I7 and I8 also flow, so that voltage drops across the resistors R7 and R8 may occur, an off set voltage from 6V is increased. As a consequence, the collector voltages of the transistors Q8 and Q7 are increased in accordance with the above-explained formula (2), and the dead time DT starts to be increased in an earlier stage (f0). Conversely, if the resistor R31<the resistor R32, then the voltage determined by the resistance ratio is high. As a result, it takes a long time in order that the current I3 starts to flow, and an increase of the dead time DT is commenced in a later stage (f2).

FIG. 16 is a graphic representation for explaining a second embodiment in which the dead time DT is variable.

In FIG. 15(a), while the predetermined switching frequency f1 which constitutes the inflection point is defined as the boundary point, the dead time DT becomes constant, or slightly increased at the frequency lower than, or equal to the switching frequency f1 as represented as "L1", whereas the dead time DT is rapidly increased at the frequency higher than, or equal to the switching frequency f1 as represented as "L2." In FIG. 16, in accordance with such a condition that the switching frequency is increased as f0, f1, f2, f3, the dead time DT is increased in such a step wise manner as L3, L4, L5, and L6 respectively.

This step-wise structure may be simply realized by employing the manner capable of forming the dead times L11, L12, L13 as explained in FIG. 15(b1). In other words, while the resistor R5 and the resistor R6 of the terminal DTMULTI shown in FIG. 13 are constituted by variable resistance elements such as transistors, the resistance ratio of the resistor R5 to the resistor R6 may be changed at a predetermined frequency, so that the arrangement with the step wise structure may be obtained.

FIG. 17 is a circuit diagram for indicating one example of the oscillating circuit 23 shown in FIG. 5.

The oscillating circuit 23 contains two sets of comparators 231 and 232. A voltage V1 of a voltage dividing resistor 235 is applied to a noninverting input terminal "a(−)" of the comparator 231; a voltage V2 (note that V1>V2) of a voltage dividing resistor 236 is applied to a noninverting input terminal "b(+)" of the comparator 232; and a voltage of a capacitor 234 is applied to both a noninverting input terminal "b(+)" of the comparator 231 and an inverting input terminal "a(−)" of the comparator 232.

Each of the comparators 231 and 232 outputs "0" when a potential of the noninverting input terminal "b (+)" is lower than a potential of the inverting input terminal "a(−)", and each of the comparators 231 and 232 outputs "1" while a potential of the noninverting input terminal "b(+)" exceeds a potential of the inverting input terminal "a(−)."

The outputs of the respective operational amplifiers 231 and 232 are inputted to an S terminal and an R terminal of an SR flip-flop 233. The output of a non-Q terminal of the SR flip-flop 233 constitutes a charging/discharging circuit of the capacitor 234.

Now, as indicated in FIG. 17, if a charging circuit of the capacitor 234 has been formed, then the potential at the capacitor 234 is increased. This potential of the capacitor 234 is outputted. In connection to this potential increase, the potential at the noninverting input terminal b(+) of the comparator 231 is increased; when the potential exceeds the potential V1 of the noninverting input terminal "a(−)", the output "1" of the comparator 231 is applied to the S terminal of the flip-flop 233; and a discharge circuit of the capacitor 234 is formed by the output of the non-Q terminal of this flip-flop 233. subsequently, the potential of the capacitor 234 is dropped, and the potential of this capacitor 234 is outputted. In connection with this potential, the potential of the noninverting input terminal b (+) of the comparator 232 is dropped, and then, when this dropped potential becomes lower than, or equal to the potential V2 of the noninverting input terminal "a(−)", the output 1 of this comparator 232 is applied to the R terminal of the flip-flop 233. Thus, a charging circuit of the capacitor 234 is formed by the output of the non-Q terminal of the flip-flop 233.

As previously explained, while the charging/discharging potentials of the capacitor 234 are outputted, the triangular wave oscillating circuit 23. Also, the inclination of the triangular wave is determined based upon the magnitude of the charging current "Ir."

It should also be understood that as the inverter circuit of the high frequency heating apparatus driven by the 2-switching element bridge according to the present invention, the present invention is not limited only to the high frequency heating apparatus shown in FIG. 5, but may be applied to all of inverter circuits arranged by such resonance type circuit systems with employment of switching elements in which arms of bridge circuits are constituted by two switching elements.

Figure 18:
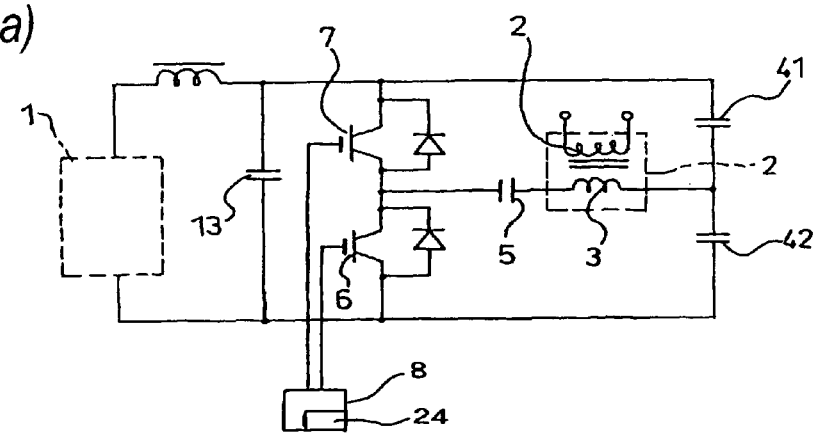
FIGS. 18(a) to 18(c) show three sets of other examples as to the resonant type high frequency heating apparatus driven by the switching elements of the 2-switching element bridge.
Figure 18:
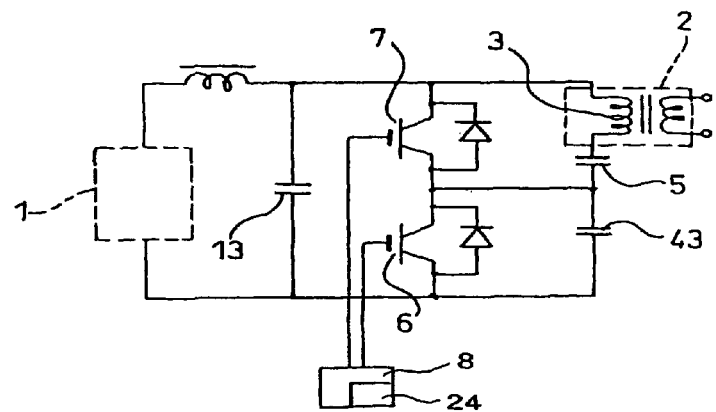
Figure 18:
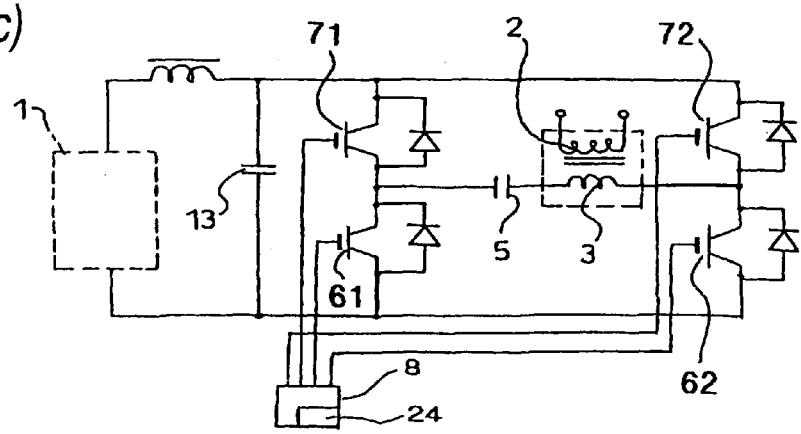

FIGS. 18(a) to 18(c) indicates 3 sorts of these inverter circuits.

In FIG. 18(a), a DC power supply 1 rectifies an AC voltage of a commercial power supply in a full-wave rectifying mode so as to obtain a DC voltage VDC. The DC power supply 1 applies this DC voltage VDC to both a series-connected circuit made of a first capacitor 41 and a second capacitor 42, and also, to a series-connected circuit constituted by a first semiconductor switching element 6 and a second semiconductor switching element 7. A series-connected circuit constituted by a primary winding 3 of a leakage transformer 2 and a third capacitor 5 has been connected between a junction point, and another junction point. The first-mentioned junction point has been formed between the first capacitor 41 and the second capacitor 42, whereas the last-mentioned junction point has been formed between the first semiconductor switching element 6 and the second semiconductor switching element 7. A control signal supplied from a driving unit 8 is applied to respective bases of the first semiconductor switching element 6 and the second semiconductor switching element 7. Then, the dead time forming circuit 24 has been assembled in the driving unit 8. It should also be noted that a secondary winding of the leakage transformer 2 and a magnetron are omitted from the drawing.

Then, a control signal converting circuit capable of realizing the objects of the present invention may be applied to this circuit as completely same as FIG. 5. In other words, in a high frequency heating apparatus comprising: a control signal forming circuit for forming a control signal from a difference between an input current of an AC power supply; a frequency modulated signal forming circuit for correcting a rectified voltage/rectified current, which are obtained by rectifying an AC voltage/AC current of the AC power supply, based upon the control signal of the control signal forming circuit; and a dead time forming circuit for receiving the output of the frequency modulated signal forming circuit, a control signal converting circuit having a function capable of further lowering the value of the control signal is provided between the control signal forming circuit and the frequency modulated signal forming circuit. Concretely speaking, while this control signal converting circuit is equipped with a comparator, the output of the control signal forming circuit is applied to one input terminal of the comparator, whereas a potential at a junction point between two resistors of a series circuit is applied to the other input terminal of the comparator. The series circuit is constituted by the above-described two resistors and a diode, which is interposed between a positive potential of another DC power supply and the output-sided terminal of the comparator. As a result, at such an instant time when the high frequency heating apparatus is changed from the initiation operation to the normal operation, since the voltage may rise without any time delay, an overshoot phenomenon of an input current can be suppressed. As a consequence, it is possible to avoid damages of the IGBTs and the magnetron.

In FIG. 18(b), a DC power supply 1 rectifies an AC voltage of a commercial power supply in a full-wave rectifying mode so as to obtain a DC voltage VDC. The DC power supply 1 applies this DC voltage VDC to both a series-connected circuit made of a primary winding 3 of a leakage transformer 2, a first capacitor 5, and a second capacitor 43, and also, to a series-connected circuit constituted by a first semiconductor switching element 6 and a second semiconductor switching element 7. A junction point constituted by the first capacitor 5 and the second capacitor 43 has been shortcircuited to another junction point constituted by the first semiconductor switching element 6 and the second semiconductor switching element 7. A control signal supplied from a driving unit 8 is applied to respective bases of the first semiconductor switching element 6 and the second semiconductor switching element 7. Then, the dead time forming circuit 24 has been assembled in the driving unit 8. It should also be noted that a secondary winding of the leakage transformer 2 and a magnetron are omitted from the drawing.

Then, a control signal converting circuit capable of realizing the objects of the present invention may be applied to this circuit as completely same as FIG. 5. In other words, in a high frequency heating apparatus comprising: a control signal forming circuit for forming a control signal from a difference between an input current of an AC power supply; a frequency modulated signal forming circuit for correcting a rectified voltage/rectified current, which are obtained by rectifying an AC voltage/AC current of the AC power supply, based upon the control signal of the control signal forming circuit; and a dead time forming circuit for receiving the output of the frequency modulated signal forming circuit, a control signal converting circuit having a function capable of further lowering the value of the control signal is provided between the control signal forming circuit and the frequency modulated signal forming circuit. Concretely speaking, while this control signal converting circuit is equipped with a comparator, the output of the control signal forming circuit is applied to one input terminal of the comparator, whereas a potential at a junction point between two resistors of a series circuit is applied to the other input terminal of the comparator. The series circuit is constituted by the above-described two resistors and a diode, which is interposed between a positive potential of another DC power supply and the output-sided terminal of the comparator. As a result, at such an instant time when the high frequency heating apparatus is changed from the initiation operation to the normal operation, since the voltage may rise without any time delay, an overshoot phenomenon of an input current can be suppressed. As a consequence, it is possible to avoid damages of the IGBTs and the magnetron.

FIG. 18(c) is a circuit diagram for showing a full-bridge circuit.

In FIG. 18(c), a DC power supply 1 rectifies an AC voltage of a commercial power supply in a full-wave rectifying mode so as to obtain a DC voltage VDC. The DC power supply 1 applies this DC voltage VDC to both a series-connected circuit made of a first semiconductor switching element 61 and a second semiconductor switching element 71, and also, to a series-connected circuit constituted by a third semiconductor switching element 62 and a fourth semiconductor switching element 72. A series-connected circuit constituted by a primary winding 3 of a leakage transformer 2 and a third capacitor 5 has been connected between a junction point, and another junction point. The first-mentioned junction point has been formed between the first semiconductor switching element 61 and the second semiconductor switching element 71, whereas the last-mentioned junction point has been formed between the third semiconductor switching element 62 and the fourth semiconductor switching element 72. The third capacitor 5 may be omitted. A control signal supplied from a driving unit 8 is applied to respective bases of the first semiconductor switching element 61, the second semiconductor switching element 71, the third semiconductor switching element 62, and the fourth semiconductor switching element 72 respectively. Then, the variable dead time forming circuit 24 according to the present invention has been assembled in the driving unit 8. It should also be noted that a secondary winding of the leakage transformer 2 and a magnetron are omitted from the drawing.

Then, a control signal converting circuit capable of realizing the objects of the present invention may be applied to this circuit as completely same as FIG. 5. In other words, in a high frequency heating apparatus comprising: a control signal forming circuit for forming a control signal from a difference between an input current of an AC power supply; a frequency modulated signal forming circuit for correcting a rectified voltage/rectified current, which are obtained by rectifying an AC voltage/AC current of the AC power supply, based upon the control signal of the control signal forming circuit; and a dead time forming circuit for receiving the output of the frequency modulated signal forming circuit, a control signal converting circuit having a function capable of further lowering the value of the control signal is provided between the control signal forming circuit and the frequency modulated signal forming circuit. Concretely speaking, while this control signal converting circuit is equipped with a comparator, the output of the control signal forming circuit is applied to one input terminal of the comparator, whereas a potential at a junction point between two resistors of a series circuit is applied to the other input terminal of the comparator. The series circuit is constituted by the above-described two resistors and a diode, which is interposed between a positive potential of another DC power supply and the output-sided terminal of the comparator. As a result, at such an instant time when the high frequency heating apparatus is changed from the initiation operation to the normal operation, since the voltage may rise without any time delay, an overshoot phenomenon of an input current can be suppressed. As a consequence, it is possible to avoid damages of the IGBTs and the magnetron.

Figure 19:
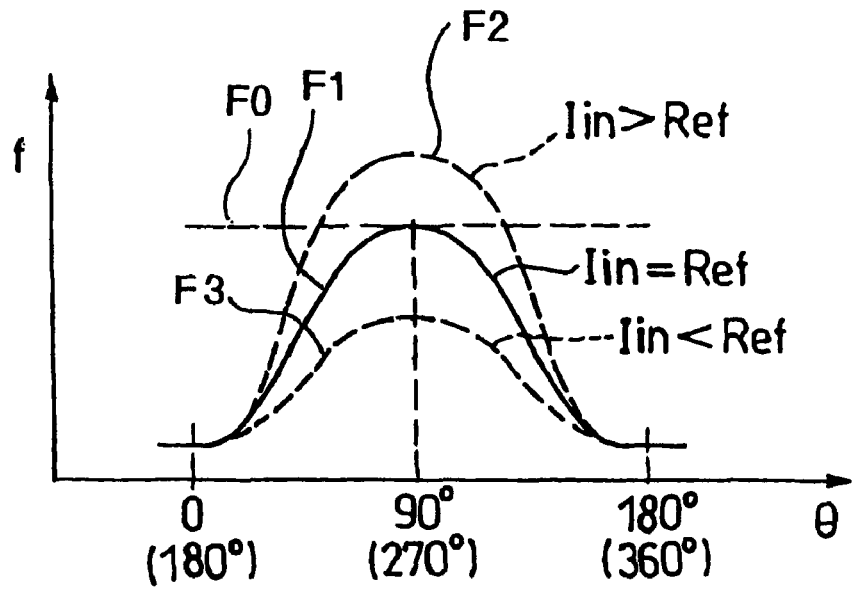
FIG. 19 is a graphic representation for indicating a frequency-to-phase characteristic as to the inverter circuit according to the present invention.

FIG. 19 is a graphic diagram for representing a frequency-to-phase characteristic of the inverter circuit according to the present invention. In FIG. 19, in phases in the vicinity of zero degree and 180 degrees where voltages are low, the switching frequency is decreased, whereas in phases in the vicinity of 90 degrees and 270 degrees, the switching frequency is increased. As a result, since the switching frequency is decreased in the phases near zero degree and 180 degrees where the voltages are low, the output current (voltage) becomes large in correspondence with the current-to-used frequency characteristic of FIG. 1. Conversely, since the voltages are sufficiently high in the phases near 90 degrees and 270 degrees, the switching frequency is maximized, and the output current (voltage) is decreased in correspondence with the current-to-used frequency characteristic of FIG. 1. As a result, as indicated in FIG. 20, the output voltage may become substantially uniform over the phases from zero degree to 180 degrees (180 to 360 degrees).

Figure 1:
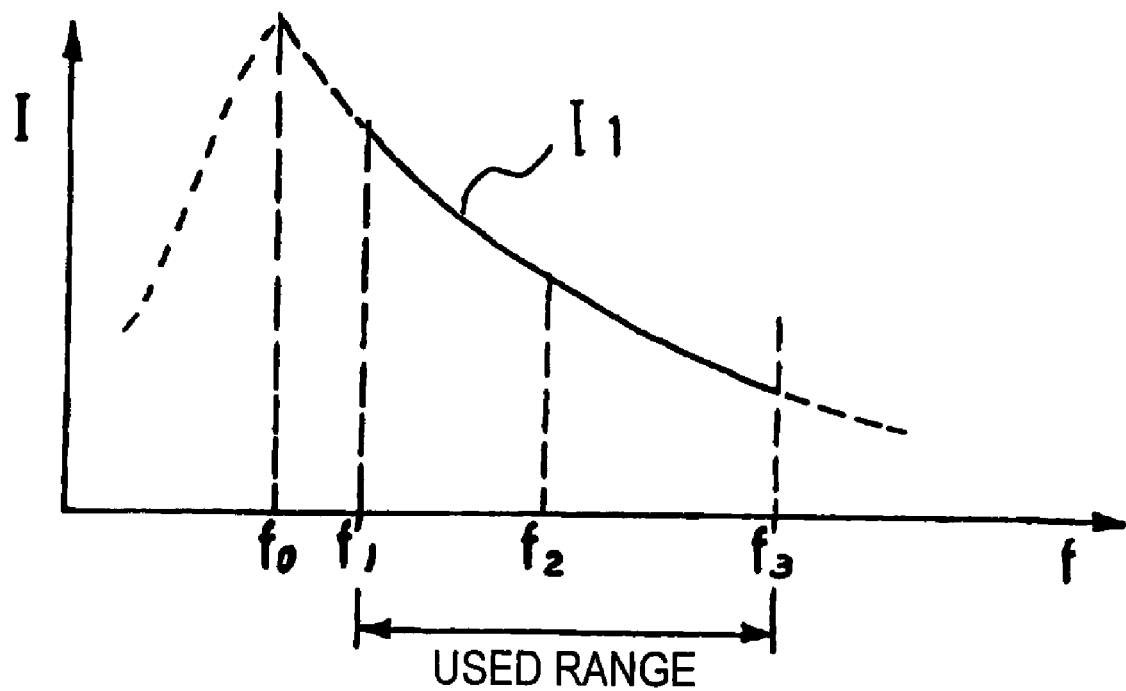
FIG. 1 is a graphic diagram for representing the current-to-used frequency characteristic in the case that the constant voltage is applied to the inverter resonant circuit according to the present invention.

In contact to the above-described condition, in such a case that no change is made in phases as indicated by a dot line "F0" in the frequency-to-phase characteristic of FIG. 19, since the frequency is high even in the phases near zero degree and 180 degrees where the voltages are low, the output current (voltage) is kept small in correspondence with the current-to-used frequency characteristic shown in FIG. 1. As a result, as indicated by a dot line "V1" in FIG. 20, a sufficiently high voltage cannot be obtained in the phases near zero degree and 180 degrees.

Also, a solid line "F1" of FIG. 19 shows a frequency-to-phase diagram in such a case that an input current "Ri (see FIG. 5)" obtained by transferring an AC current by a CT when a DC power supply is formed is made equal to the reference current "Ref" so as to obtain zero error. An other solid line "F2" indicates a frequency-to-phase diagram in the case that the input current Ri is larger than the reference current Ref, and the switching frequency is increased so as to lower the current within the used range of FIG. 1. A solid line "F3" shows a frequency-to-phase diagram in the case that the input current Ri is smaller than the reference current Ref, and the switching frequency is decreased so as to increase the current within the used range of FIG. 1.

Figure 20:
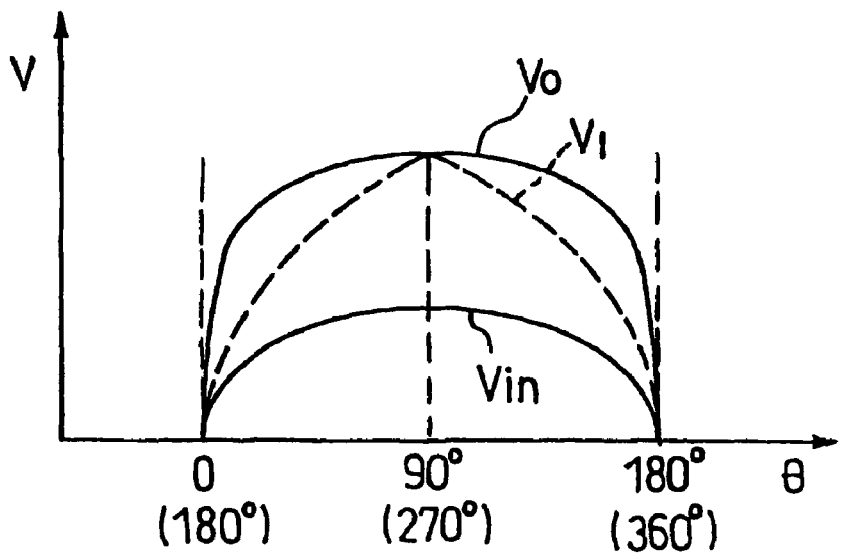
FIG. 20 is a graphic representation for showing an output voltage-to-phase characteristic as to the inverter circuit.

In FIG. 20, symbol "Vin" indicates a voltage waveform of a commercial power supply; a dot line "V1" located over this voltage waveform "Vin" represents such a voltage waveform in such a case that a switching operation is performed at a certain constant frequency over all of the phases; and symbol "V0" indicates a waveform of a voltage (secondary voltage of step-up transformer) which has been produced by frequency-modulating the above-described voltage as explained in FIG. 19. Although ratios of these voltages Vin, V1, V0 are largely different from each other, these voltages are indicated on the same diagram for the sake of easy observation. As indicated by the dot line "F0" of FIG. 19, the secondary voltage of the set-up transformer in the case of the constant frequency which is not modulated corresponds to the dot line "V1", and this voltage waveform is not matched with a non-linear load of a magnetron. To the contrary, as shown in the line diagram "F1" of FIG. 19, since in phases in the vicinity of zero degree and 180 degrees where voltages are low, the switching frequency is decreased, whereas in phases in the vicinity of 90 degrees and 270 degrees, the switching frequency is increased, the output current (voltage) becomes large in the phases near zero degree and 180 degrees where the voltages are low, and conversely, the output current (voltage) is decreased in the phases near 90 degrees and 270 degrees, as represented by symbol "V0" of FIG. 20, a constant voltage may be generated on the secondary side of the step-up transformer even in any phases over the phases defined from zero degree to 180 degrees (180 to 360 degrees). This waveform is matched with the non-linear load of the magnetron.

It should also be noted that this dead time forming circuit 24 may become effective as to the control operation of the dead time DT even in such a case that the switching elements (IGBTs) 6 and 7 shown in FIG. 5 are controlled in a duty ratio control manner. This reason is given as follows: That is, in order to increase/decrease the collector voltages VQ7C and VQ8C in the interconnecting manner for controlling the dead time DT, the center voltage of 6 V may be merely changed. Since this center voltage of 6 V is changed, the ON/OFF ratio of the two transistors Q8 and Q7 may be changed (namely, duty ratio control operation). In other words, when the duty ratio of the two transistors Q7 and Q8 is equal to 50:50 (since two transistors Q7/Q8 are operated at power supply voltage of 12 V, when two transistors Q7/Q8 are driven at voltage of 6 V), the output voltage becomes the highest voltage. When the two transistors Q7/Q8 are driven at voltages which are lower than, or higher than 6 V, the collector voltages VQ8C and VQ7C of these two transistors Q8 and Q7 are simultaneously increased and decreased in the interconnecting manner, and thus, the ON/OFF ratio of the two transistors Q8/Q7 is changed. As a result, the output voltage is decreased. However, also in this case, since the offset voltages produced in the resistors R8 and R7 are not changed, the constant output voltage may be maintained. As a consequence, as apparent from the foregoing descriptions, this variable dead time forming circuit 24 may become effective so as to vary the dead time also in the case of the duty ratio control operation.

As previously explained, in accordance with the present invention, in the high frequency heating apparatus comprising: the control signal forming circuit for forming the control signal from the difference between the input current of the AC power supply and the reference current, or the difference between the voltage to be applied to the magnetron and the reference voltage; the frequency modulated signal forming circuit for correcting the rectified voltage/rectified current which are obtained by rectifying the AC voltage/current of the AC power supply based upon the control signal of the control signal forming circuit; and the dead time forming circuit for receiving the output of the frequency modulated signal forming circuit; the control signal converting circuit having the function capable of further lowering (in case of positive polarity) the value of the control signal is provided between the control signal forming circuit and the frequency modulated signal forming circuit. Concretely speaking, while the control signal converting circuit is equipped with the operational amplifier, the output of the control signal forming circuit is applied to one input terminal of the operational amplifier, whereas the potential at the junction point between the two resistors of the series circuit is applied to the other input terminal of the operational amplifier. The series circuit is constituted by the above-described two resistors and the diode, which is interposed between the positive potential of another DC power supply and the output-sided terminal of the operational amplifier. As a result, at such an instant time when the high frequency heating apparatus is changed from the initiation operation to the normal operation, since the voltage may rise without any time delay, an overshoot phenomenon of an input current can be suppressed. As a consequence, it is possible to avoid damages of the IGBTs and the magnetron.

While the present invention has been described in detail, or with reference to the specific embodiment modes, it is obvious for the ordinarily-skilled engineers that the present invention may be freely modified and/or changed without departing from the technical scope and spirit of the present invention. The present patent application has been made based upon Japanese Patent Application No. 2004-132640 filed on Apr. 28, 2004, the contents of which have been incorporated herein as references.

INDUSTRIAL APPLICABILITY

Since the above-described arrangement is employed, the voltage can rise without any time delay at the instantaneous time when the operation is switched from the initiation operation to the normal operation. As a consequence, the overshoot of the input current can be suppressed, so that the damages as to the IGBTs and the magnetron can be prevented.

The invention claimed is:

1. A high frequency heating apparatus for driving a magnetron, comprising:
   a DC power supply which is constituted by an AC power supply, a rectifying circuit for rectifying an AC voltage of said AC power supply, and a smoothing capacitor for smoothing an output voltage of said rectifying circuit;
   a series circuit constituted by two pieces of semiconductor switching elements;
   a resonant circuit in which a primary winding of a leakage transformer and a capacitor are connected, said series circuit being connected parallel to said DC power supply, and one end of said resonant circuit being connected to a center point of said series circuit and the other end of said resonant circuit being connected to one end of said DC power supply in an AC equivalent circuit;
   driving means for driving said semiconductor switching elements respectively by alternately turning on and off said semiconductor switching elements while providing a dead time for concurrently turning off said two semiconductor switching elements;
   rectifying means connected to a secondary winding of said leakage transformer; and
   the magnetron connected to said rectifying means;
   a control signal forming circuit for forming a control signal from a difference between an input current of the AC power supply and a reference current, or a difference between a voltage to be applied to the magnetron and a reference voltage;
   a frequency modulated signal forming circuit for correcting rectified voltage/rectified current which are obtained by rectifying the AC voltage/current of the AC power supply based upon the control signal of the control signal forming circuit;
   a dead time forming circuit for generating a dead time control signal which enables the driving means to set said dead time depending on the output of the frequency modulated signal forming circuit; and
   a control signal converting circuit configured to lower the value of said control signal when polarity of the control signal converting circuit is positive, the control signal converting circuit being disposed between and connected to said control signal forming circuit and said frequency modulated signal forming circuit.

2. A high frequency heating apparatus for driving a magnetron, comprising:
   a DC power supply which is constituted by AC power supply, a rectifying circuit for rectifying an AC voltage of said AC power supply, and a smoothing capacitor for smoothing an output voltage of said rectifying circuit;
   two sets of series circuits, each of said series circuits being constituted by two pieces of semiconductor switching elements;
   a resonant circuit in which a primary winding of a leakage transformer and a capacitor are connected, said two sets of series circuits being connected parallel to said DC power supply respectively, and one end of said resonant circuit being connected to a center point of said one series circuit and the other end of said resonant circuit being connected to a center point of the other series circuit;
   driving means for driving said semiconductor switching elements respectively by alternately turning on and off said semiconductor switching elements while providing a dead time for concurrently turning off said two semiconductor switching elements;
   rectifying means connected to a secondary winding of said leakage transformer; and
   the magnetron connected to said rectifying means;
   a control signal forming circuit for forming a control signal from a difference between an input current of the AC power supply and a reference current, or a difference between a voltage to be applied to the magnetron and a reference voltage;
   a frequency modulated signal forming circuit for correcting rectified voltage/rectified current which are obtained by rectifying the AC voltage/current of the AC power supply based upon the control signal of the control signal forming circuit;
   a dead time forming circuit for generating a dead time control signal which enables the driving means to set said dead time depending on the output of the frequency modulated signal forming circuit; and a control signal converting circuit configured to lower the value of said control signal when polarity of the control signal converting circuit is positive, the control signal converting circuit being disposed between and connected to said control signal forming circuit and said frequency modulated signal forming circuit.

3. A high frequency heating apparatus for driving a magnetron, comprising:
   a DC power supply which is constituted by an AC power supply, a rectifying circuit for rectifying an AC voltage of said AC power supply, and a smoothing capacitor for smoothing an output voltage of said rectifying circuit;
   a series circuit constituted by two pieces of semiconductor switching elements;
   a resonant circuit in which a primary winding of a leakage transformer and a capacitor are connected, said series circuit being connected parallel to said DC power supply, and said resonant circuit being connected to one of said semiconductor switching elements in a parallel manner;
   driving means for driving said semiconductor switching elements respectively by alternately turning on and off said semiconductor switching elements while providing a dead time for concurrently turning off said two semiconductor switching elements;
   rectifying means connected to a secondary winding of said leakage transformer; and
   the magnetron connected to said rectifying means;
   a control signal forming circuit for forming a control signal from a difference between an input current of the AC power supply and a reference current, or a difference between a voltage to be applied to the magnetron and a reference voltage;
   a frequency modulated signal forming circuit for correcting rectified voltage/rectified current which are obtained by rectifying the AC voltage/current of the AC power supply based upon the control signal of the control signal forming circuit;
   a dead time forming circuit for generating a dead time control signal which enables the driving means to set said dead time depending on the output of the frequency modulated signal forming circuit; and
   a control signal converting circuit configured to lower the value of said control signal when polarity of the control signal converting circuit is positive, the control signal converting circuit being disposed between and connected to said control signal forming circuit and said frequency modulated signal forming circuit.

4. A high frequency heating apparatus as claimed in any one of claims 1 to 3, wherein said control signal converting circuit is comprised of an operational amplifier; the output of said control signal converting circuit is applied to one input terminal of said operational amplifier, and a potential at a junction point between two resistors of a series circuit is applied to the other input terminal of said operational amplifier; and said series circuit is constituted by said two resistors and a diode, which is interposed between a positive potential of another DC power supply and the output-sided terminal of said operational amplifier.

5. A high frequency heating apparatus as claimed in any one of claims 1 to 3, wherein said control signal converting circuit is comprised of an amplifier having a comparing function;
   the output of said control signal forming circuit is entered to one input terminal of said amplifier, and the positive potential of said DC power supply is entered to the other input terminal of said amplifier; and a gain of said amplifier is switched by conducting/non-conducting a diode as said comparing function.

6. A high frequency heating apparatus as claimed in any one of claims 1 to 3, wherein said control signal converting circuit is comprised of an amplifier having a comparing function; the output of said control signal forming circuit is entered to one input terminal of said amplifier, and the other input terminal of said amplifier owns a comparator which compares the positive potential of said DC power supply with the output of said control signal forming circuit; and a gain of said amplifier is switched by said comparator.

7. A high frequency heating apparatus as claimed in any one of claims 1 to 3, wherein in the case that said control signal converting circuit is operated in a negative polarity instead of said positive polarity, said control signal converting circuit inverts the respective signals in said positive polarity.

8. A high frequency heating apparatus as claimed in any one of claims 1 to 3, wherein said control signal is switched based upon a sensing signal of a magnetron oscillation sensing means.

9. A high frequency heating apparatus as claimed in any one of claims 1 to 3, wherein said dead time forming circuit makes the dead time constant, or slightly increases the dead time irrespective of a switching frequency.

10. A high frequency heating apparatus as claimed in any one of claims 1 to 3, wherein said dead time forming circuit increases the dead time in connection with an increase of a switching frequency.

11. A high frequency heating apparatus as claimed in claim 10, wherein said dead time forming circuit makes the dead time constant, or slightly increases the dead time at a switching frequency which is lower than, or equal to a predetermined switching frequency.

12. A high frequency heating apparatus as claimed in claim 10, wherein said dead time forming circuit rapidly increases the dead time at a switching frequency which is higher than, or equal to a predetermined switching frequency.

13. A high frequency heating apparatus as claimed in claim 11, wherein either the constant value or the slightly increased value as to said dead time is variable at the switching frequency lower than, or equal to said predetermined switching frequency is variable.

14. A high frequency heating apparatus as claimed in claim 11, wherein said predetermined frequency is variable.

15. A high frequency heating apparatus as claimed in any one of claims 1 to 3, wherein said dead time forming circuit increases the dead time in a step wise manner in connection with an increase of a switching frequency.

16. A high frequency heating apparatus as claimed in any one of claims 1 to 3, wherein said dead time forming circuit forms the dead time based upon both a plus offset voltage and a minus offset voltage, which are changed in a first inclination which is directly proportional to an increase of the switching frequency, and also, which are changed in a second inclination from said predetermined switching frequency.

17. A high frequency heating apparatus as claimed in any one of claims 1 to 3 wherein:
   said dead time forming circuit is comprised of:
   a VCC power supply;
   a duty control power supply;
   a first current which is changed directly proportional to a switching frequency;
   a second current which flows from the predetermined switching frequency and is changed directly proportional to the switching frequency;

a third current which is produced by combining said first current with said second current and by multiplying said combined current by a predetermined coefficient; and upper/lower potential forming means for forming an upper potential and a lower potential, which are made by adding both a plus offset voltage and a minus offset voltage which are directly proportional to said third current to the voltage of said duty control power supply; and said variable dead time forming circuit forms the dead time based upon said upper potential and said lower potential.

18. A high frequency heating apparatus as claimed in claim 17 wherein:

either an input power control operation or an input current control operation is carried out by changing at least one of said voltage of the duty control power supply and said switching frequency.

19. A high frequency heating apparatus as claimed in claim 12, wherein the rapidly increased value as to said dead time is variable at the switching frequency higher than, or equal to said predetermined switching frequency is variable.

20. A high frequency heating apparatus as claimed in claim 12, wherein said predetermined frequency is variable.

21. A high frequency heating apparatus as claimed in any one of claims 1 to 3, wherein said dead time forming circuit controls said driving means.

* * * * *